(12) United States Patent
Forbes Jones et al.

(10) Patent No.: US 10,287,655 B2
(45) Date of Patent: *May 14, 2019

(54) NICKEL-BASE ALLOY AND ARTICLES

(71) Applicant: ATI Properties LLC, Albany, OR (US)

(72) Inventors: Robin M. Forbes Jones, Saint Helena Island, SC (US); Christopher D. Rock, Monroe, NC (US)

(73) Assignee: ATI PROPERTIES LLC, Albany, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/678,527

(22) Filed: Aug. 16, 2017

(65) Prior Publication Data

US 2017/0349977 A1  Dec. 7, 2017

Related U.S. Application Data

(63) Continuation of application No. 15/433,443, filed on Feb. 15, 2017, which is a continuation of application
(Continued)

(51) Int. Cl.
*C22C 19/05* (2006.01)
*C22F 1/10* (2006.01)
(Continued)

(52) U.S. Cl.
CPC .......... *C22C 19/058* (2013.01); *B21D 22/022* (2013.01); *B21J 1/06* (2013.01); *C22C 19/05* (2013.01); *C22F 1/10* (2013.01)

(58) Field of Classification Search
CPC ... C22C 19/053; C22C 19/055; C22C 19/058; C22F 1/10
See application file for complete search history.

(56) References Cited

U.S. PATENT DOCUMENTS 2,857,269 A  10/1958  Vordahl
2,974,076 A  7/1959  Harris et al.
(Continued)

FOREIGN PATENT DOCUMENTS

CA  2787980 A  7/2011
CN  1070230 A  3/1993
(Continued)

OTHER PUBLICATIONS

Gil et al., "Formation of alpha-Widmanstatten structure: effects of grain size and cooling rate on the Widmanstatten morphologies and on the mechanical properties in Ti6Al4V alloy", Journal of Alloys and Compounds, 329, 2001, pp. 142-152.
(Continued)

*Primary Examiner* — Jessee R Roe
(74) *Attorney, Agent, or Firm* — Robert J. Toth; K&L Gates LLP

(57) ABSTRACT

An alloy is disclosed comprising up to 0.05 weight percent carbon, 27.0 to 31.0 weight percent chromium, up to 0.5 weight percent copper, 7.0 to 11.0 weight percent iron, up to 0.5 weight percent manganese, up to 0.015 weight percent sulfur, up to 0.5 weight percent silicon, at least 58 weight percent nickel, and incidental impurities, wherein the alloy exhibits an ASTM grain size of 3.0 to 9.0, exhibits a uniform grain size distribution, includes intergranular $M_{23}C_6$ carbide precipitates uniformly distributed on grain boundaries, and includes minimal or no intragranular $M_{23}C_6$ carbide precipitates. Articles of manufacture including the alloy also are described.

30 Claims, 4 Drawing Sheets

Related U.S. Application Data

No. 14/093,707, filed on Dec. 2, 2013, now Pat. No. 9,616,480, which is a continuation of application No. 13/150,494, filed on Jun. 1, 2011, now Pat. No. 8,652,400.

(51) Int. Cl.
*B21D 22/02* (2006.01)
*B21J 1/06* (2006.01)

(56) References Cited

U.S. PATENT DOCUMENTS

| | | |
|---|---|---|
| 2,932,886 A | 4/1960 | Althouse |
| 3,015,292 A | 1/1962 | Bridwell |
| 3,025,905 A | 3/1962 | Haerr |
| 3,060,564 A | 10/1962 | Corral |
| 3,082,083 A | 3/1963 | Levy et al. |
| 3,117,471 A | 1/1964 | O'Connell et al. |
| 3,313,138 A | 4/1967 | Spring et al. |
| 3,379,522 A | 4/1968 | Vordahl |
| 3,436,277 A | 4/1969 | Bomberger, Jr. et al. |
| 3,469,975 A | 9/1969 | Bomberger, Jr. et al. |
| 3,489,617 A | 1/1970 | Wuerfel |
| 3,584,487 A | 6/1971 | Carlson |
| 3,605,477 A | 9/1971 | Carlson |
| 3,615,378 A | 10/1971 | Bomberger, Jr. et al. |
| 3,635,068 A | 1/1972 | Watmough et al. |
| 3,649,259 A | 3/1972 | Heitman |
| 3,676,225 A | 7/1972 | Owczarski et al. |
| 3,686,041 A | 8/1972 | Lee |
| 3,802,877 A | 4/1974 | Parris et al. |
| 3,815,395 A | 6/1974 | Sass |
| 3,835,282 A | 9/1974 | Sass et al. |
| 3,922,899 A | 12/1975 | Fremont et al. |
| 3,979,815 A | 9/1976 | Nakanose et al. |
| 4,053,330 A | 10/1977 | Henricks et al. |
| 4,067,734 A | 1/1978 | Curtis et al. |
| 4,094,708 A | 6/1978 | Hubbard et al. |
| 4,098,623 A | 7/1978 | Ibaraki et al. |
| 4,120,187 A | 10/1978 | Mullen |
| 4,138,141 A | 2/1979 | Andersen |
| 4,147,639 A | 4/1979 | Lee et al. |
| 4,150,279 A | 4/1979 | Metcalfe et al. |
| 4,163,380 A | 8/1979 | Masoner |
| 4,197,643 A | 4/1980 | Burstone et al. |
| 4,229,216 A | 10/1980 | Paton et al. |
| 4,299,626 A | 11/1981 | Paton et al. |
| 4,309,226 A | 1/1982 | Chen |
| 4,472,207 A | 9/1984 | Kinoshita et al. |
| 4,473,125 A | 9/1984 | Addudle et al. |
| 4,482,398 A | 11/1984 | Eylon et al. |
| 4,510,788 A | 4/1985 | Ferguson et al. |
| 4,543,132 A | 9/1985 | Berczik et al. |
| 4,614,550 A | 9/1986 | Leonard et al. |
| 4,631,092 A | 12/1986 | Ruckle et al. |
| 4,639,281 A | 1/1987 | Sastry et al. |
| 4,668,290 A | 5/1987 | Wang et al. |
| 4,687,290 A | 8/1987 | Prussas |
| 4,688,290 A | 8/1987 | Hogg |
| 4,690,716 A | 9/1987 | Sabol et al. |
| 4,714,468 A | 12/1987 | Wang et al. |
| 4,798,632 A | 1/1989 | Yonezawa et al. |
| 4,799,975 A | 1/1989 | Ouchi et al. |
| 4,808,249 A | 2/1989 | Eyelon et al. |
| 4,842,653 A | 6/1989 | Wirth et al. |
| 4,851,055 A | 7/1989 | Eylon et al. |
| 4,854,977 A | 8/1989 | Alheritiere et al. |
| 4,857,269 A | 8/1989 | Wang et al. |
| 4,878,966 A | 11/1989 | Alheritiere et al. |
| 4,888,973 A | 12/1989 | Comley |
| 4,889,170 A | 12/1989 | Mae et al. |
| 4,917,728 A | 4/1990 | Enright |
| 4,919,728 A | 4/1990 | Kohl et al. |
| 4,943,412 A | 7/1990 | Bania et al. |
| 4,957,567 A | 9/1990 | Krueger et al. |
| 4,975,125 A | 12/1990 | Chakrabarti et al. |
| 4,980,127 A | 12/1990 | Parris et al. |
| 5,026,520 A | 6/1991 | Bhowal et al. |
| 5,032,189 A | 7/1991 | Eylon et al. |
| 5,041,262 A | 8/1991 | Gigliotti, Jr. |
| 5,074,907 A | 12/1991 | Amato et al. |
| 5,080,727 A | 1/1992 | Aihara et al. |
| 5,094,812 A | 3/1992 | Dulmaine et al. |
| 5,141,566 A | 8/1992 | Kitayama et al. |
| 5,156,807 A | 10/1992 | Nagata et al. |
| 5,162,159 A | 11/1992 | Tenhover et al. |
| 5,169,597 A | 12/1992 | Davidson et al. |
| 5,173,134 A | 12/1992 | Chakrabarti et al. |
| 5,201,457 A | 4/1993 | Kitayama et al. |
| 5,244,517 A | 9/1993 | Kimura et al. |
| 5,256,369 A | 10/1993 | Ogawa et al. |
| 5,264,055 A | 11/1993 | Champin et al. |
| 5,277,718 A | 1/1994 | Paxson et al. |
| 5,310,522 A | 5/1994 | Culling |
| 5,330,591 A | 7/1994 | Vasseur |
| 5,332,454 A | 7/1994 | Meredith et al. |
| 5,332,545 A | 7/1994 | Love |
| 5,342,458 A | 8/1994 | Adams et al. |
| 5,358,586 A | 10/1994 | Schutz et al. |
| 5,359,872 A | 11/1994 | Nashiki |
| 5,360,496 A | 11/1994 | Kuhlman et al. |
| 5,374,323 A | 12/1994 | Kuhlman et al. |
| 5,399,212 A | 3/1995 | Chakrabarti |
| 5,442,847 A | 8/1995 | Semiatin et al. |
| 5,472,526 A | 12/1995 | Gigliotti, Jr. |
| 5,494,636 A | 2/1996 | Dupoiron et al. |
| 5,509,979 A | 4/1996 | Kimura |
| 5,516,375 A | 5/1996 | Ogawa et al. |
| 5,520,879 A | 5/1996 | Saito et al. |
| 5,527,403 A | 6/1996 | Schirra et al. |
| 5,545,262 A | 8/1996 | Hardee et al. |
| 5,545,268 A | 8/1996 | Yashiki et al. |
| 5,547,523 A | 8/1996 | Blankenship et al. |
| 5,558,728 A | 9/1996 | Kobayashi et al. |
| 5,530,665 A | 12/1996 | Taguchi et al. |
| 5,600,989 A | 2/1997 | Segal et al. |
| 5,649,280 A | 7/1997 | Blankenship et al. |
| 5,658,403 A | 8/1997 | Kimura |
| 5,662,745 A | 9/1997 | Takayama et al. |
| 5,679,183 A | 10/1997 | Takagi et al. |
| 5,698,050 A | 12/1997 | El-Soudani |
| 5,758,420 A | 6/1998 | Schmidt et al. |
| 5,759,305 A | 6/1998 | Benz et al. |
| 5,759,484 A | 6/1998 | Kashii et al. |
| 5,795,413 A | 8/1998 | Gorman |
| 5,871,595 A | 2/1999 | Ahmed et al. |
| 5,896,643 A | 4/1999 | Tanaka |
| 5,897,830 A | 4/1999 | Abkowitz et al. |
| 5,904,204 A | 5/1999 | Teraoka et al. |
| 5,954,724 A | 9/1999 | Davidson |
| 5,980,655 A | 11/1999 | Kosaka |
| 6,002,118 A | 12/1999 | Kawano et al. |
| 6,032,508 A | 3/2000 | Ashworth et al. |
| 6,044,685 A | 4/2000 | Delgado et al. |
| 6,053,993 A | 4/2000 | Reichman |
| 6,059,904 A | 5/2000 | Benz et al. |
| 6,071,360 A | 6/2000 | Gillespie |
| 6,077,369 A | 6/2000 | Kusano et al. |
| 6,127,044 A | 10/2000 | Yamamoto et al. |
| 6,132,526 A | 10/2000 | Carisey et al. |
| 6,139,659 A | 10/2000 | Takahashi et al. |
| 6,143,241 A | 11/2000 | Hajaligol et al. |
| 6,187,045 B1 | 2/2001 | Fehring et al. |
| 6,197,129 B1 | 3/2001 | Zhu et al. |
| 6,200,685 B1 | 3/2001 | Davidson |
| 6,209,379 B1 | 4/2001 | Nishida et al. |
| 6,216,508 B1 | 4/2001 | Matsubara et al. |
| 6,228,189 B1 | 5/2001 | Oyama et al. |
| 6,250,812 B1 | 6/2001 | Ueda et al. |
| 6,258,182 B1 | 7/2001 | Schetky et al. |
| 6,284,071 B1 | 9/2001 | Suzuki et al. |
| 6,332,935 B1 | 12/2001 | Gorman |
| 6,334,350 B1 | 1/2002 | Shin et al. |
| 6,334,912 B1 | 1/2002 | Ganin et al. |

(56) References Cited

U.S. PATENT DOCUMENTS

| | | |
|---|---|---|
| 6,384,388 B1 | 5/2002 | Anderson et al. |
| 6,387,197 B1 | 5/2002 | Bewlay et al. |
| 6,391,128 B2 | 5/2002 | Ueda et al. |
| 6,399,215 B1 | 6/2002 | Zhu et al. |
| 6,402,859 B1 | 6/2002 | Ishii et al. |
| 6,409,852 B1 | 6/2002 | Lin et al. |
| 6,532,786 B1 | 3/2003 | Luttgeharm |
| 6,536,110 B2 | 3/2003 | Smith et al. |
| 6,539,607 B1 | 4/2003 | Fehring et al. |
| 6,539,765 B2 | 4/2003 | Gates |
| 6,558,273 B2 | 5/2003 | Kobayashi et al. |
| 6,561,002 B2 | 5/2003 | Okada et al. |
| 6,569,270 B2 | 5/2003 | Segal |
| 6,576,068 B2 | 6/2003 | Grubb et al. |
| 6,607,693 B1 | 8/2003 | Saito et al. |
| 6,632,304 B2 | 10/2003 | Oyama et al. |
| 6,632,396 B1 | 10/2003 | Tetjukhin et al. |
| 6,663,501 B2 | 12/2003 | Chen |
| 6,726,784 B2 | 4/2004 | Oyama et al. |
| 6,742,239 B2 | 6/2004 | Lee et al. |
| 6,764,647 B2 | 7/2004 | Aigner et al. |
| 6,773,520 B1 | 8/2004 | Fehring et al. |
| 6,786,985 B2 | 9/2004 | Kosaka et al. |
| 6,800,153 B2 | 10/2004 | Ishii et al. |
| 6,823,705 B2 | 11/2004 | Fukuda et al. |
| 6,908,517 B2 | 6/2005 | Segal et al. |
| 6,918,971 B2 | 7/2005 | Fujii et al. |
| 6,932,877 B2 | 8/2005 | Raymond et al. |
| 6,971,256 B2 | 12/2005 | Okada et al. |
| 7,008,491 B2 | 3/2006 | Woodfield |
| 7,010,950 B2 | 3/2006 | Cai et al. |
| 7,032,426 B2 | 4/2006 | Durney et al. |
| 7,037,389 B2 | 5/2006 | Barbier et al. |
| 7,038,426 B2 | 5/2006 | Hill |
| 7,081,173 B2 | 7/2006 | Bahar et al. |
| 7,096,596 B2 | 8/2006 | Hernandez, Jr. |
| 7,132,021 B2 | 11/2006 | Kuroda et al. |
| 7,152,449 B2 | 12/2006 | Dudley et al. |
| 7,264,682 B2 | 9/2007 | Chandran et al. |
| 7,269,986 B2 | 9/2007 | Pfaffmann et al. |
| 7,332,043 B2 | 2/2008 | Tetyukhin et al. |
| 7,410,610 B2 | 8/2008 | Woodfield et al. |
| 7,438,849 B2 | 10/2008 | Kuramoto et al. |
| 7,449,075 B2 | 11/2008 | Woodfield et al. |
| 7,536,892 B2 | 5/2009 | Amino et al. |
| 7,559,221 B2 | 7/2009 | Horita et al. |
| 7,601,232 B2 | 10/2009 | Fonte |
| 7,611,592 B2 | 11/2009 | Davis et al. |
| 7,708,841 B2 | 5/2010 | Saller et al. |
| 7,837,812 B2 | 11/2010 | Marquardt et al. |
| 7,879,286 B2 | 2/2011 | Miracle et al. |
| 7,947,136 B2 | 5/2011 | Saller |
| 7,984,635 B2 | 7/2011 | Callebaut et al. |
| 8,037,730 B2 | 10/2011 | Polen et al. |
| 8,043,446 B2 | 10/2011 | Jung et al. |
| 8,048,240 B2 | 11/2011 | Hebda et al. |
| 8,128,764 B2 | 3/2012 | Miracle et al. |
| 8,211,548 B2 | 7/2012 | Chun et al. |
| 8,316,687 B2 | 11/2012 | Slattery |
| 8,336,359 B2 | 12/2012 | Werz |
| 8,408,039 B2 | 4/2013 | Cao et al. |
| 8,430,075 B2 | 4/2013 | Qiao et al. |
| 8,454,765 B2 | 6/2013 | Saller et al. |
| 8,499,605 B2 | 8/2013 | Bryan |
| 8,551,264 B2 | 10/2013 | Kosaka et al. |
| 8,568,540 B2 | 10/2013 | Marquardt et al. |
| 8,578,748 B2 | 11/2013 | Huskamp et al. |
| 8,597,442 B2 | 12/2013 | Hebda et al. |
| 8,597,443 B2 | 12/2013 | Hebda et al. |
| 8,608,913 B2 | 12/2013 | Shim et al. |
| 8,613,818 B2 | 12/2013 | Forbes Jones et al. |
| 8,623,155 B2 | 1/2014 | Marquardt et al. |
| 8,652,400 B2 | 2/2014 | Forbes Jones et al. |
| 8,679,269 B2 | 3/2014 | Goller et al. |
| 8,834,653 B2 | 9/2014 | Bryan |
| 8,919,168 B2 | 12/2014 | Valiev et al. |
| 9,034,247 B2 | 5/2015 | Suzuki et al. |
| 9,050,647 B2 | 6/2015 | Thomas et al. |
| 9,192,981 B2 | 11/2015 | Forbes Jones et al. |
| 9,206,497 B2 | 12/2015 | Bryan et al. |
| 9,255,316 B2 | 2/2016 | Bryan |
| 9,327,342 B2 | 5/2016 | Oppenheimer et al. |
| 9,523,137 B2 | 12/2016 | Marquardt et al. |
| 9,616,480 B2 | 4/2017 | Forbes Jones et al. |
| 9,624,567 B2 | 4/2017 | Bryan et al. |
| 9,732,408 B2 | 8/2017 | Sanz et al. |
| 9,765,420 B2 | 9/2017 | Bryan |
| 9,777,361 B2 | 10/2017 | Thomas et al. |
| 9,796,005 B2 | 10/2017 | Hebda et al. |
| 2002/0033717 A1 | 3/2002 | Matsuo |
| 2003/0168138 A1 | 9/2003 | Marquardt |
| 2004/0099350 A1 | 5/2004 | Mantione et al. |
| 2004/0148997 A1 | 8/2004 | Amino et al. |
| 2004/0221929 A1 | 11/2004 | Hebda et al. |
| 2004/0250932 A1 | 12/2004 | Briggs |
| 2005/0047952 A1 | 3/2005 | Coleman |
| 2005/0145310 A1 | 7/2005 | Bewlay et al. |
| 2006/0045789 A1 | 3/2006 | Nasserrafi et al. |
| 2006/0110614 A1 | 5/2006 | Liimatainen |
| 2006/0243356 A1 | 11/2006 | Oikawa et al. |
| 2007/0017273 A1 | 1/2007 | Haug et al. |
| 2007/0098588 A1 | 5/2007 | Narita et al. |
| 2007/0193662 A1 | 8/2007 | Jablokov et al. |
| 2008/0000554 A1 | 1/2008 | Yaguchi et al. |
| 2008/0103543 A1 | 5/2008 | Li et al. |
| 2008/0107559 A1 | 5/2008 | Nishiyama et al. |
| 2008/0202189 A1 | 8/2008 | Otaki |
| 2008/0210345 A1 | 9/2008 | Tetyukhin et al. |
| 2008/0264932 A1 | 10/2008 | Hirota |
| 2009/0000706 A1 | 1/2009 | Huron et al. |
| 2009/0183804 A1 | 7/2009 | Zhao et al. |
| 2009/0234385 A1 | 9/2009 | Cichocki et al. |
| 2011/0180188 A1 | 7/2011 | Bryan et al. |
| 2011/0183151 A1 | 7/2011 | Yokoyama et al. |
| 2012/0067100 A1 | 3/2012 | Stefansson et al. |
| 2012/0076611 A1 | 3/2012 | Bryan |
| 2012/0076612 A1 | 3/2012 | Bryan |
| 2012/0076686 A1 | 3/2012 | Bryan |
| 2012/0279351 A1 | 11/2012 | Gu et al. |
| 2013/0062003 A1 | 3/2013 | Shulkin et al. |
| 2013/0156628 A1 | 6/2013 | Forbes Jones et al. |
| 2014/0076471 A1 | 3/2014 | Forbes Jones et al. |
| 2014/0238552 A1 | 8/2014 | Forbes Jones et al. |
| 2014/0261922 A1 | 9/2014 | Thomas et al. |
| 2015/0129093 A1 | 5/2015 | Forbes Jones et al. |
| 2016/0122851 A1 | 5/2016 | Jones et al. |
| 2016/0201165 A1 | 7/2016 | Foltz, IV |
| 2017/0058387 A1 | 3/2017 | Marquardt et al. |
| 2017/0146046 A1 | 5/2017 | Foltz, IV |
| 2017/0218485 A1 | 8/2017 | Jones et al. |
| 2017/0321313 A1 | 11/2017 | Thomas et al. |
| 2018/0016670 A1 | 1/2018 | Bryan |
| 2018/0195155 A1 | 7/2018 | Bryan |

FOREIGN PATENT DOCUMENTS

| | | |
|---|---|---|
| CN | 1194671 A | 9/1998 |
| CN | 1403622 | 3/2003 |
| CN | 1816641 A | 8/2006 |
| CN | 101104898 A | 1/2008 |
| CN | 101205593 A | 6/2008 |
| CN | 101294264 A | 10/2008 |
| CN | 101684530 A | 3/2010 |
| CN | 101637789 B | 6/2011 |
| CN | 102212716 A | 10/2011 |
| CN | 102816953 A | 12/2012 |
| DE | 19743802 A1 | 3/1999 |
| DE | 10128199 A1 | 12/2002 |
| DE | 102010009185 A1 | 11/2011 |
| EP | 0066361 A2 | 12/1982 |
| EP | 0109350 A2 | 5/1984 |
| EP | 0320820 A1 | 6/1989 |
| EP | 0535817 B1 | 4/1995 |
| EP | 0611831 B1 | 1/1997 |

(56) References Cited

FOREIGN PATENT DOCUMENTS

| | | |
|---|---|---|
| EP | 0834580 A1 | 4/1998 |
| EP | 0870845 A1 | 10/1998 |
| EP | 0707085 61 | 1/1999 |
| EP | 0683242 61 | 5/1999 |
| EP | 0969109 A1 | 1/2000 |
| EP | 1083243 A2 | 3/2001 |
| EP | 1136582 A1 | 9/2001 |
| EP | 1302554 A1 | 4/2003 |
| EP | 1302555 A1 | 4/2003 |
| EP | 1433863 | 6/2004 |
| EP | 1471158 A1 | 10/2004 |
| EP | 1605073 A1 | 12/2005 |
| EP | 1612289 A2 | 1/2006 |
| EP | 1375690 B1 | 3/2006 |
| EP | 1717330 A1 | 11/2006 |
| EP | 1882752 A2 | 1/2008 |
| EP | 2028435 A1 | 2/2009 |
| EP | 2281908 A1 | 2/2011 |
| EP | 1546429 B1 | 6/2012 |
| FR | 2545104 A1 | 11/1984 |
| GB | 847103 | 9/1960 |
| GB | 1433306 | 4/1976 |
| GB | 1170997 A | 11/1984 |
| GB | 2151260 A | 7/1985 |
| GB | 2337762 A | 12/1999 |
| JP | 55-113865 A | 9/1980 |
| JP | 57-62820 A | 4/1982 |
| JP | 57-62846 A | 4/1982 |
| JP | S58-210158 A | 12/1983 |
| JP | 60-046358 | 3/1985 |
| JP | 60-100655 A | 6/1985 |
| JP | S61-060871 | 3/1986 |
| JP | S61-217564 A | 9/1986 |
| JP | 62-109956 A | 5/1987 |
| JP | 62-127074 A | 6/1987 |
| JP | 62-149859 A | 7/1987 |
| JP | S62-227597 A | 10/1987 |
| JP | S62-247023 A | 10/1987 |
| JP | S63-49302 A | 3/1988 |
| JP | S63-188426 A | 8/1988 |
| JP | H01-272750 A | 10/1989 |
| JP | 1-279736 A | 11/1989 |
| JP | 2-205661 A | 8/1990 |
| JP | 3-134124 A | 6/1991 |
| JP | H03-138343 A | 6/1991 |
| JP | H03-166350 A | 7/1991 |
| JP | H03-264618 A | 11/1991 |
| JP | H03-274238 A | 12/1991 |
| JP | 4-74856 A | 3/1992 |
| JP | 4-103737 A | 4/1992 |
| JP | 4-143236 A | 5/1992 |
| JP | 4-168227 A | 6/1992 |
| JP | 5-59510 A | 3/1993 |
| JP | 5-117791 A | 5/1993 |
| JP | 5-195175 A | 8/1993 |
| JP | 9-194969 A | 11/1993 |
| JP | H05-293555 A | 11/1993 |
| JP | H06-93389 A | 4/1994 |
| JP | 8-300044 A | 11/1996 |
| JP | 9-143650 | 6/1997 |
| JP | 9-215786 A | 8/1997 |
| JP | H10-128459 A | 5/1998 |
| JP | H10-306335 A | 11/1998 |
| JP | H11-21642 A | 1/1999 |
| JP | H11-309521 A1 | 11/1999 |
| JP | H11-319958 A | 11/1999 |
| JP | 11-343528 A | 12/1999 |
| JP | 11-343548 A | 12/1999 |
| JP | 2000-153372 A | 6/2000 |
| JP | 2000-234887 A | 8/2000 |
| JP | 2001-71037 A | 3/2001 |
| JP | 2001-081537 A | 3/2001 |
| JP | 2001-343472 A | 12/2001 |
| JP | 2002-69591 A | 3/2002 |
| JP | 2002-146497 A | 5/2002 |
| JP | 2003-55749 A | 2/2003 |
| JP | 2003-74566 A | 3/2003 |
| JP | 2003-285126 A | 10/2003 |
| JP | 2003-334633 A | 11/2003 |
| JP | 2004-131761 | 4/2004 |
| JP | 2005-281855 A | 10/2005 |
| JP | 2007-291488 A | 11/2007 |
| JP | 2007-327118 A | 12/2007 |
| JP | 2008-200730 A | 9/2008 |
| JP | 2009-138218 A | 6/2009 |
| JP | WO 2009/142228 A1 | 11/2009 |
| JP | 2009-299110 A | 12/2009 |
| JP | 2009-299120 A | 12/2009 |
| JP | 2010-70833 A | 4/2010 |
| JP | 2012-140690 A | 7/2012 |
| JP | 2015-54332 A | 3/2015 |
| KR | 920004946 | 6/1992 |
| KR | 10-2005-0087765 A | 8/2005 |
| KR | 10-2009-0069647 A | 7/2009 |
| RU | 2003417 C1 | 11/1993 |
| RU | 1131234 C | 10/1994 |
| RU | 2156828 C1 | 9/2000 |
| RU | 2197555 C1 | 7/2001 |
| RU | 2172359 C1 | 8/2001 |
| RU | 2217260 C1 | 11/2003 |
| RU | 2234998 C1 | 8/2004 |
| RU | 2269584 C1 | 2/2006 |
| RU | 2288967 C1 | 12/2006 |
| RU | 2364660 C1 | 8/2009 |
| RU | 2368695 C1 | 9/2009 |
| RU | 2378410 C1 | 1/2010 |
| RU | 2392348 C2 | 6/2010 |
| RU | 2393936 C1 | 7/2010 |
| RU | 2441089 C1 | 1/2012 |
| SU | 534518 A1 | 1/1977 |
| SU | 631234 A | 11/1978 |
| SU | 1077328 A | 5/1982 |
| SU | 1135798 A1 | 1/1985 |
| SU | 1088397 A1 | 2/1991 |
| UA | 38805 A | 5/2001 |
| UA | 40862 A | 8/2001 |
| UA | a200613448 | 6/2008 |
| WO | WO 98/17836 A1 | 4/1998 |
| WO | WO 98/22629 A | 5/1998 |
| WO | WO 02/36847 A2 | 5/2002 |
| WO | WO 02/070763 A1 | 9/2002 |
| WO | WO 02/086172 A1 | 10/2002 |
| WO | WO 02/090607 A1 | 11/2002 |
| WO | WO 2004/101838 A1 | 11/2004 |
| WO | WO 2007/084178 A2 | 7/2007 |
| WO | WO 2007/114439 A1 | 10/2007 |
| WO | WO 2007/142379 A1 | 12/2007 |
| WO | WO 2008/017257 A1 | 2/2008 |
| WO | WO 2009/082498 A1 | 7/2009 |
| WO | WO 2009/142228 A1 | 11/2009 |
| WO | WO 2010/084883 A1 | 7/2010 |
| WO | WO 2012/063504 A1 | 7/2010 |
| WO | WO 2012/147742 A1 | 11/2012 |
| WO | WO 2013/081770 A1 | 6/2013 |
| WO | WO 2013/130139 A2 | 9/2013 |

OTHER PUBLICATIONS

Enayati et al., "Effects of temperature and effective strain on the flow behavior of Ti—6Al—4V", Journal of the Franklin Institute, 348, 2011, pp. 2813-2822.

Longxian et al., "Wear-Resistant Coating and Performance Titanium and Its Alloy, and properties thereof", Northeastern University Press, Dec. 2006, pp. 26-28, 33.

"Acceleration and Improvement for Heat Treating Workers," Quick Start and Improvement for Heat Treatment, ed. Yang Man, China Machine Press, Apr. 2008, pp. 265-266.

Decision on Appeal dated Dec. 15, 2017 in U.S. Appl. No. 12/903,851.

Office Action dated Feb. 27, 2018 in U.S. Appl. No. 13/108,045.

Corrected Notice of Allowability dated Dec. 20, 2017 in U.S. Appl. No. 13/777,066.

Office Action dated Dec. 1, 2017 in U.S. Appl. No. 14/077,699.

(56) References Cited

OTHER PUBLICATIONS

Interview Summary dated Mar. 12, 2018 in U.S. Appl. No. 14/077,699.
Notice of Panel Decision from Pre-Appeal Brief Review dated Oct. 27, 2017 in U.S. Appl. No. 14/028,588.
Notice of Allowance dated Feb. 9, 2018 in U.S. Appl. No. 14/028,588.
Advisory Action dated Jan. 26, 2018 in U.S. Appl. No. 14/594,300.
Office Action dated Feb. 28, 2018 in U.S. Appl. No. 14/594,300.
Office Action dated Oct. 31, 2017 in U.S. Appl. No. 15/653,985.
Office Action dated Dec. 6, 2017 in U.S. Appl. No. 14/948,941.
Office Action dated Feb. 15, 2018 in U.S. Appl. No. 14/948,941.
U.S. Appl. No. 15/816,128 filed Nov. 17, 2017.
Guidelines for PWR Steam Generator Tubing Specifications and Repair, 84 pages, Apr. 1999, EPRI.
Materials Reliability Program: Guidelines for Thermally Treated Alloy 690 Pressure Vessel Nozzles, 56 pages, Jul. 2008, EPRI.
Microstructure Etching and Carbon Analysis Techniques, 370 pages, May 1990, EPRI.
Johan Frodigh, Some Factors Affecting the Appearance of Microstructure in Alloy 690, Aug. 1997.
Haruhiko Kaimura et al., Corrosion Resistance of TT Alloy 690, Aug. 1997.
"Allvac TiOsteum and TiOstalloy Beat Titanium Alloys", printed from www.allvac.com/allvac/pages/Titanium/TiOsteum.htm on Nov. 7, 2005.
"Datasheet: Timetal 21S", Alloy Digest, Advanced Materials and Processes (Sep. 1998), pp. 38-39.
"Heat Treating of Nonferrous Alloys: Heat Treating of Titanium and Titanium Alloys," Metals Handbook; ASM Handbooks Online (2002).
"Stryker Orthopaedics TMZF® Alloy (UNS R58120)", printed from www.allvac.com/allvac/pages/Titanium/UNSR58120.htm on Nov. 7, 2005.
"Technical Data Sheet: Allvac® Ti-15Mo Beta Titanium Alloy" (dated Jun. 16, 2004).
ASM Materials Engineering Dictionary, "Blasting or Blast Cleaning," J.R. Davis Ed., ASM International, Materials Park. OH (1992) p. 42.
"ASTM Designation F1801-97 Standard Practice for Corrosion Fatigue Testing of Metallic Implant Materials" ASTM International (1997) pp. 876-880.
"ASTM Designation F2066-01 Standard Specification for Wrought Titanium-15 Molybdenum Alloy for Surgical Implant Applications (UNS R58150)," ASTM International (2000) pp. 1-4.
AL-6XN® Alloy (UNS N08367) Allegheny Ludlum Corporation, 2002, 56 pages.
Allegheny Ludlum, "High Performance Metals for Industry, High Strenoth, High Temperature, and Corrosion-Resistant Alloys", (2000) pp. 1-8.
ALLVAC, Product Specification for "Allvac Ti-15 Mo," available at http://www.allvac.com/allvac/pages/Titanium/Ti15MO.htm, last visited Sep. 6, 2003 p. 1 of 1.
Altemp® A286 Iron-Base Superalloy (UNS Designation S66286) Allegheny Ludlum Technical Data Sheet Blue Sheet, 1998, 8 pages.
ASM Materials Engineering Dictionary, J.R. Davis Ed., ASM International. Materials Park, OH (1992) p. 39.
ATI Datalloy 2 Alloy, Technical Data Sheet, ATE Allvac, Monroe, NC, SS-844, Version1, Sep. 17, 2010, 8 pages.
ATI 38-644™ Beta Titanium Alloy Technical Data Sheet, UNS 858640, Version 1, Dec. 21, 2011, 4 pages.
ATI 690 (UNS N06690) Nickel-Base, ATI Allvac, Oct. 5, 2010, 1 page.
Isothermal forging definition, ASM Materials Engineering Dictionary, J.R. Davis ed.. Fifth Printing, Jan. 2006, ASM International, p. 238.
Isothermal forging, printed from http://thelibraryofmanufacturing.com/isothermal_forging.html, accessed Jun. 5, 2013, 3 pages.
Adiabatic definition, ASM Materials Engineering Dictionary, J.R. Davis ed., Fifth Printing, Jan. 2006, ASM International. p. 9.
Adiabatic process—Wkipedia, the free encyclopedia, printed from http://en.wikipedia.org/wiki/Adiabatic_process, accessed May 21, 2013, 10 pages.
ASTM Desingation F 2066-01, "Standard Specification for Wrought Titanium-15 Molybdenum Alloy for Surgical Implant Applications (UNS R58150)", May 2001, 7 pages.
ASTM Designation F 2066/F2066M-13, "Standard Specification for Wrought Titanium-15 Molybdenum Alloy for Surgical Implant Applications (UNS R58150)", Nov. 2013, 6 pages.
ATI 6-2-4-2™ Alloy Technical Data Sheet, Version 1, Feb. 26, 2012, 4 pages.
ATI 6-2-4-6™ Titanium Alloy Data Sheet, accessed Jun. 6, 2012.
ATI 425, High-Strength Titanium Alloy, Alloy Digest, ASM International, Jul. 2004. 2 pages.
ATI 425® Alloy Applications, retrieved from http://web.archive.org/web/20100704044024/http://www.alleghenytechnologies.com/ATI425/applications/default.asp#other, Jul. 4, 2010. Way Back Machine, 2 pages.
ATI 425® Alloy, Technical Data Sheet, retrieved from http://web.archive.org/web/20100703120218/http://www.alleghenytechnologies.com/ATI425/specifications/datasheet.asp, Jul. 3, 2010, Way Back Machine, 5 pages.
ATI 425®-MIL Alloy, Technical Data Sheet, Version 1, May 28, 2010, pp. 1-5.
ATI 425®-MIL Alloy, Technical Data Sheet, Version 2, Aug. 16, 2010, 5 pages.
ATI 425®-MIL Titanium Alloy, Mission Critical Metallicse, Version 3, Sep. 10, 2009, pp. 1-4.
ATI 425® Titanium Alloy, Grade 38 Technical Data Sheet, Version 1, Feb. 1, 2012, pp. 1-6.
ATI 425® Alloy, Grade 38, Titanium Alloy UNS R54250 Technical Data Sheet, Version 1, Nov. 25, 2013, pp. 1-6.
ATI 500-MIL ®, Mission Critical Metallics®, High Hard Specialty Steel Armor, Version 4, Sep. 10, 2009, pp. 1-4.
ATI 600-MIL®, Preliminary Draft Data Sheet, Ultra High Hard Specialty Steel Armor, Version 4, Aug. 10, 2010, pp. 1-3.
ATI 600-MIL®, Preliminary Draft Data Sheet,Ultra High Hard Specialty Steel Armor, Version 3, Sep. 10, 2009, pp. 1-3.
ATI Aerospace Materials Development, Mission Critical Metallics, Apr. 30, 2008, 17 pages.
ATI Ti-15Mo Beta Titanium Alloy Technical Data Sheet, ATI Allvac, Monroe, NC, Mar. 21, 2008, 3 pages.
ATI Titanium 6Al—2Sn—4Zr—2Mo Alloy, Technical Data Sheet, Version 1, Sep. 17, 2010. pp. 1-3.
ATI Titanium 6Al—4V Alloy, Mission Critical Metallics®, Technical Data Sheet, Version 1, Apr. 22, 2010, pp. 1-3.
ATI Wah Chang, ATI 425™ Titanium Alloy (Ti—4A—2.5V—1.5Fe-0.2.502), Technical Data Sheet, 2004. pp. 1-5.
ATI Wah Chang, Titanium and Titanium Alloys, Technical Data Sheet, 2003, pp. 1-16.
Beal et al., "Forming of Titanium and Titanium Alloys-Cold Forming", ASM Handbook, 2006, ASM International, vol. 14B, 2 pages.
Beal et al., "Forming of Titanium and Titanium Alloys-Cold Forming", ASM Handbook, 2006 ASM International, Revised by ASM Committee on Forming Titanium Alloys, vol. 145, 2 pages.
Beal et al., "Forming of Titanium and Titanium Alloys-Cold Forming", ASM Handbook, 2006, vol. 14B, pp. 656-669.
Bewlay, et al., "Superplastic roll forming of Ti alloys", Materials and Design, 21, 2000, pp. 287-295.
Bowen, A. W., "Omega Phase Embrittlement in Aged Ti-15%Mo," Scripta Metallurgica, vol. 5, No. 8 (1971) pp. 709-715.
Bowen, A. W., "On the Strengthening of A Metastable b-Titanium Alloy by w- and a-Precipitation" Royal Aircraft Establishment Technical Memorandum Mat 338, (1980) pp. 1-15 and Figs 1-5.
Boyer, Rodney R., "Introduction and Overview of Titanium and Titanium Alloys: Applications," Metals Handbook, ASM Handbooks Online (2002).
Boyko et al., "Modeling of the Open-Die and Radial Forging Processes for Alloy 718", Superalloys 718, 625 and Various Derivatives. Proceedings of the International Symposium on the Metallurgy and Applications of Superalloys 718, 625 and Various Derivatives, held Jun. 23, 1992, pp. 107-124.

(56) References Cited

OTHER PUBLICATIONS

Cain, Patrick, "Warm forming aluminum magnesium components; How it can optimize formability, reduce springback", Aug. 1, 2009, from http://www.thefabricator.com/article/presstechnology/warm-forming-aluminum-magnesium-components, 3 pages.
Callister, Jr., Wiliam D., Materials Science and Engineering, An introduction, Sixth Edition, John Wiley & Sons, pp. 180-184 (2003).
Craighead et al., "Ternary Alloys of Titanium", Journal of Metals, Mar. 1950, Transactions AIME, vol. 188, pp. 514-538.
Craighead et al., "Titanium Binary Alloys", Journal of Metals, Mar. 1950, Transactions AIME, vol. 188, pp. 485-513.
Desrayaud et al., "A novel high straining process for bulk materials—The development of a multipass forging system by compression along three axes", Journal of Materials Processing Technology, 172, 2006, pp. 152-158.
Diderrich et al., "Addition of Cobalt to the Ti—6Al—4V Alloy", Journal of Metals. May 1968. pp. 29-37.
DiDomizio, et al., "Evaluation of a Ni—20Cr Alloy Processed by Multi-axis Forging", Materials Science Forum vols. 503-504, 2006, pp. 793-798.
Disegi, J. A., "Titanium Alloys for Fracture Fixation implants," Injury International Journal of the Care of the Injured, vol. 31 (2000) pp. S-D14-17.
Disegi, John, Wrought Titanium-15% Molybdenum Implant Material, Original Instruments and Implants of the Association for the Study of International Fixation—AO ASIF, Oct. (2003).
Donachie Jr., M.J., "Titanium A Technical Guide" 1988, ASM, pp. 39 and 46-50.
Donachie Jr., M.J., "Heat Treating Titanium and its Alloys", Heat Treating Process, Jun./Jul. 2001, pp. 47-49, 52-53, and 56-57.
Duflou et al., "A method for force reduction in heavy duty bending", Int. J. Materials and Product Technology, vol. 32. No. 4, 2008, pp. 460-475.
Elements of Metallurgy and Engineering Alloys, Editor F. C. Campbell, ASM International, 2008, Chapter 8, p. 125.
Fedotov, S.G. et al., "Effect of Aluminum and Oxygen on the Formation of Metastable Phases in Alloys of Titanium with .beta.-Stabilizing Elements", Izvestiya Akademii Nauk SSSR, Metally (1974) pp. 121-126.
Froes, F.H. et al., "The Processing Window for Grain Size Control in Metastable Beta Titanium Alloys", Beta Titanium Alloys in the 80's, ed. by R. Boyer and H. Rosenberg, AIME, 1984, pp. 161-164.
Gigliotti et al., "Evaluation of Superplastically Roll Formed VT-25", Titanium'99, Science and Technology, 2000, pp. 1581-1588.
Gilbert et al., "Heat Treating of Titanium and Titanium Alloys—Solution Treating and Aging". ASM Handbook, 1991, ASM international, vol. 4, pp. 1-8.
Glazunov et al., Structural Titanium Alloys, Moscow, Metallurgy, 1974, pp. 264-283.
Greenfield, Dan L., News Release, ATI Aerospace Presents Results of Year-Long Characterization Program for New ATI 425 Alloy Titanium Products at Aeromat 2010. Jun. 21, 2010, Pittsburgh, Pennsylvania, 1 page.
Harper, Megan Lynn, "A Study of the Microstructural and Phase Evolutions in Timetal 555", Jan. 2004, retrieved from http://www.ohiolink.etu/etd/send-pdf.cgi/harper%20megan%20lynn.pdf?acc_num=osu1132165471 on Aug. 10, 2009, 92 pages.
Hawkins, M.J. et al., "Osseointegration of a New Beta Titanium Alloy as Compared to Standard Orthopaedic Implant Metals," Sixth World Biomaterials Congress Transactions, Society for Biomaterials, 2000, p. 1083.
Ho, W.F. et al., "Structure and Properties of Cast Binary Ti-Mo Alloys" Biornaterials, vol. 20 (1999) pp. 2115-2122.
Hsieh, Chih-Chun and Weite Wu, "Overview of Intermetallic Sigma Phase Precipitation in Stainless Steels", ISRN Metallurgy, vol. 2012, 2012, pp. 1-16.
Imatani et al., "Experiment and simulation for thick-plate bending by high frequency inductor", ACTA Metallurgica Sinica, vol. 11, No. 6, Dec. 1998, pp. 449-455.

Imayev et al., "Formation of submicrocrystalline structure in TiAl intermetallic compound", Journal of Materials Science, 27, 1992, pp. 4465-4471.
Imayev et al., "Principles of Fabrication of Bulk Ultrafine-Grained and Nanostructured Materials by Multiple Isothermal Forging", Materials Science Forum, vol. 638-642, 2010, pp. 1702-1707.
Imperial Metal Industries Limited, Product Specification for "IMI Titanium 205", The Kynoch Press (England) pp. 1-5. (1965).
Jablokov et al., "Influence of Oxygen Content on the Mechanical Properties of Titanium-35Niobium-7Zirconium-5Tantalum Beta Titanium Alloy," Journal of ASTM International, Sep. 2005, vol. 2, No. 8, 2002, pp. 1-12.
Jablokov et al., "The Application of Ti-15 Mo Beta Titanium Alloy in High Strength Orthopaedic Applications", Journal of ASTM International, vol. 2, Issue 8 (Sep. 2005) (published online Jun. 22, 2005).
Kovtun, et al., "Method of calculating induction heating of steel sheets during thermomechanical bending", Kiev, Nikolaev, translated from Problemy Prochnosti, No. 5, pp. 105-110, May 1973, original article submitted Novernber 27, 1977, pp. 600-606.
Lampman, S., "Wrought arid Titanium Alloys," ASM Handbooks Online, ASM International 2002.
Lee et al., "An electromagnetic and thermo-mechanical analysis of high frequency induction heating for steel plate bending", Key Engineering Materials, vols. 326-328, 2006, pp. 1283-1286.
Lemons, Jack et al., "Metallic Biomaterials for Surgical Implant Devices," BONEZone, Fall (2002) p. 5-9 and Table.
Long, M. et al., "Friction and Surface Behavior of Selected Titanium Alloys During Reciprocating-Sliding Motion", WEAR, 249(1-2), Jan. 17, 2001, 158-168.
Lüjering, G. and J.C. Williams, Titanium, Springer, New York (2nd ed. 2007) p. 24.
Lutjering, G. and Williams, J.C., Titanium, Springer-Verlag, 2003, Ch. 5: Alpha=Beta Alloys, p. 177-201.
Marquardt et al., "Beta Titanium Alloy Processed for High Strength Orthopaedic Applications, "Journal of ASTM International, vol. 2, Issue 9 (Oct. 2005) (published online Aug. 17, 2005).
Marquardt, Brian, "Characterization of Ti-15Mo for Orthopaedic Applications, "TMS 2005 Annual Meeting: Technical Program, San Francisco, CA, Feb. 13-17, 2005 Abstract, p. 239.
Marquardt, Brian, "Ti-15Mo Beta Titanium Alloy Processed for High Strength Orthopaedic Applications," Program and Abstracts for the Symposium on Titanium Niobium, Zirconium, and Tantalum for Medical and Surgical Applications, Washington, D.C., Nov. 9-10, 2004 Abstract, p. 11.
Marte et al., "Structure and Properties of Ni-20CR Produced by Severe Plastic Deformation", Ultrafine Grained Materials IV, 2006, pp. 419-424.
Materials Properties Handbook: Titanium Alloys, Eds. Boyer et al, ASM International, Materials Park, OH, 1994, pp. 524-525.
Martinelli, Gianni and Roberto Peroni, "Isothermal forging of Ti-alloys for medical applications", Presented at the 11th World Conference on Titanium, Kyoto, Japan, Jun. 4-7, 2007, accessed Jun. 5, 2013, 5 pages.
McDevitt, et al., Characterization of the Mechanical Properties of ATI 425 Alloy According to the Guidelines of the Metallic Materials Properties Development & Standardization Handbook, Aeromat 2010 Conference and Exposition: Jun. 20-24, 2010, Bellevue, WA, 23 pages.
Metals Handbook, Desk Edition, 2nd ed., J. R. Davis ed., ASM International, Materials Park, Ohio (1998), pp. 575-588.
Military Standard, Fastener Test Methods, Method 13, Double Shear Test, MIL-STD-1312-13, Jul. 26, 1985, superseding MIL-STD-1312 (in part) May 31, 1967, 8 pages.
Military Standard, Fastener Test Methods, Method 13, Double Shear Test, Mil-Std-1312-13A, Aug. 23, 1991, superseding MIL-STD-13, Jul. 26, 1985, 10 pages.
Murray, J.L., et al., Binary Alloy Phase Diagrams, Second Edition, vol. 1, Ed. Massaiski, Materials Park, OH; ASM International; 1990, p. 547.
Murray, J.L., The Mn—Ti (Manganese-Titanium) System, Bulletin of Alloy Phase Diagrams, vol. 2 No. 3 (1981) p. 334-343.

(56) References Cited

OTHER PUBLICATIONS

Myers, J., "Primary Working, A lesson from Titanium and its Alloys," ASM Course Book 27 Lesson, Test 9, Aug. 1994, pp. 3-4.
Naik, Uma M. et al., "Omega and Alpha Precipitation in Ti-15Mo Alloy."Titanium '80 Science and Technology—Proceedings of the 4th International Conference on Titanium, H. Kimura & O. Izumi Eds. May 19-22 , 1980 pp. 1335-1341.
Nguyen et al., "Analysis of bending deformation in triangle heating of steel plates with induction heating process using laminated plate theory", Mechanics Based Design of Structures and Machines, 37, 2009, pp. 228-246.
Nishimura, T. "Ti—15Mo—5Zr—3Al", Materials Properties Handbook: Titanium Alloys, eds. R. Boyer et al., ASM International, Materials Park, OH, 1994, p. 949.
Novikov et al., 17.2.2 Deformable (α+γ) alloys. Chapter 17, Titanium and its Alloys, Metal Science, vol. II Thermal Treatment of the Alloy, Physical Metallurgy, 2009, pp. 357-360.
Nutt, Michael J. et al., "The Application of Ti-15 Beta Titanium Alloy in High Strength Structural Orthopaedic Applications,"Program and Abstracts for the Symposium on Titanium Niobium, Zirconium, and Tantalum for Medical and Surgical Applications, Washington, D.C., Nov. 9-10, 2004 Abstract, p. 12.
Nyakana, et al., "Quick Reference Guide for γ Titanium Alloys in the 00s", Journal of Materials Engineering and Performance, vol. 14, No. 6, Dec. 1, 2005, pp. 799-811.
Pennock, G.M. et al., "The Control of a Precipitation by Two Step Ageing in γTi—15Mo," Titanium '80 Science and Technology—Proceedings of the 4th International Conference on Titanium, H. Kimura & O. Izumi Eds. May 19-22 (1980) pp. 1344-1350.
Prasad, Y.V.R.K. et al. "Hot Deformation Mechanism in Ti—6Al—4V with Transformed B Starting Microstructure: Commercial v. Extra Low lnterstitial Grade", Materials Science and Technology, Sep. 2000, vol. 16, pp. 1029-1036.
Qazi, J.I. et al., "High-Strength Metastable Beta-Titanium Alloys for Biomedical Applications," JOM, Nov. 2004 pp. 49-51.
Roach, M.D., et al., "Comparison of the Corrosion Fatigue Characteristics of CPTi-Grade 4, Ti—6Al—4V ELI, Ti—6Al—7 Nb, and Ti—15 Mo", Journal of Testing and Evaluation, vol. 2, Issue 7, (Jul./Aug. 2005) (published online Jun. 8, 2005).
Roach, M.D., et al., "Physical, Metallurgical, and Mechanical Comparison of a Low-Nickel Stainless Steel," Transactions on the 27th Meeting of the Society for Biomaterials, Apr. 24-29, 2001, p. 343.
Roach, M.D., et al., "Stress Corrosion Cracking of a Low-Nickel Stainless Steel," Transactions of the 27th Annual Meeting of the Society for Biomaterials, 2001, p. 469.
Rudnev et at., "Longitudinal flux indication heating of slabs, bars and strips is no longer "Black Magic:" II", Industrial Heating, Feb. 1995, pp. 46-48 and 50-51.
SAE Aerospace Material Specification 4897A (issued Jan. 1997, revised Jan. 2003).
SAE Aerospace, Aerospace Material Specification, Titanium Alloy Bars, Forgings and Forging Stock, 6.0Al—4.0V Annealed, AMS 6931A, Issued Jan. 2004, Revised Feb. 2007, pp. 1-7.
SAE Aerospace, Aerospace Material Specification, Titanium Alloy Bars, Forgings and Forging Stock, 6.0Al—4.0V, Solution Heat Treated and Aged, AMS 6930A, Issued Jan. 2004, Revised Feb. 2006, pp. 1-9.
SAE Aerospace, Aerospace Material Specification, Titanium Alloy, Sheet, Strip, and Plate, 4Al—1.5V—1.5Fe, Annealed, AMS 8946A, issued Oct. 2006, Revised Jun. 2007, pp. 1-7.
Salishchev et al., "Characterization of Submicron-grained Ti—6Al—4V Sheets with Enhanced Superplastic Properties", Materials Science Forum, Trans Tech Publications, Switzerland, vols. 447-448, 2004, pp. 441-446.
Salishchev et al., "Mechanical Properties of Ti—6Al—4V Titanium Alloy with Submicrocrystalline Structure Produced by Muitiaxial Forging", Materials Science Forum, vols. 584-586, 2008, pp. 783-788.
Salishchev, et al., "Effect of Deformation Conditions on Grain Size and Microstructure Homogeneity of γ-Rich Titanium Alloys". Journal of Materials Engineering and Performance., vol. 14(6), Dec. 2005, pp. 709-716.
Salishchev, G.A., "Formation of submicrocrystalline structure in large size billets and sheets out of titanium alloys", Institute for Metals Superpiasticity Problems,Ufa, Russia, presented at 2003 NATO Advanced Research Workshop, Kyiv, Ukraine, Sep. 9-13, 2003. 50 pages.
Semiatin, S.L. et al., "The Thermomechanical Processing of Alpha/Beta Titanium Alloys," Journal of Metals, Jun. 1997, pp. 33-39.
Semiatin et al., "Equal Channel Angular Extrusion of Difficult-to-Work Alloys", Materials & Design, Elsevier Science Ltd., 21, 2000, pp. 311-322.
Semiatin et al., "Alpha/Beta Heat Treatment of a Titanium Alloy with a Nonuniform Microstructure", Metallurgical and Materials Transactions A, vol. 38A, Apr. 2007, pp. 910-921.
Shahan et al., "Adiabatic shear bands in titanium and titanium alloys: a critical review", Materials & Design, vol. 14, No. 4, 1993, pp. 243-250.
SPS Titanium™ Titanium Fasteners, SPS Technologies Aerospace Fasteners, 2003, 4 pages.
Standard Specification for Wrought Titanium-6Aluminum-4Vanadium Alloy for Surgical Implant Applications (UNS R56400), Designation: F 1472-99, ASTM 1999, pp. 1-4.
Swann, P.R. and J. G. Parr, "Phase Transformations in Titanium-Rich Alloys of Titanium and Cobalt", Transactions of the Metallurgical Society of AIME, Apr. 1958, pp. 276-279.
Takemoto Y et al., "Tensile Behavior and Cold Workability of Ti—Mo Alloys", Materials Transactions Japan Inst. Metals Japan, vol. 45, No. 5, May 2004, pp. 1571-1576.
Tamarisakandala, S. et al., "Strain-induced Porosity During Clogging of Extra-Low Interstitial Grade Ti—6Al—4V", Journal of Materials Engineering and Performance, vol. 10(2), Apr. 2001, pp. 125-130.
Tamirisakandala et al., "Effect of boron on the beta transus of Ti—6Al—4V alloy", Scripta Materiaiia, 53, 2005, pp. 217-222.
Tamirisakandala et al., "Powder Metallurgy Ti—6Al—4V—xB Alloys: Processing, Microstructure, and Properties", JOM, May 2004, pp. 60-63.
Tebbe, Patrick A. and Ghassan T. Kridli, "Warm forming aluminum alloys: an overview and future directions", Int. J. Materials and Product Technology, vol. 21, Nos. 1-3, 2004, pp. 24-40.
Technical Presentation: Overview of MMPDS Characterization of ATI 425 Alloy, 2012, 1 page.
TIMET 6-6-2 Titanium Alloy (Ti—6Al—6V—2Sn), Annealed, accessed Jun. 27, 2012.
TIMET TIMETAL® 6-2-4-2 (Ti—6Al—2Sn—4Zr—2Mo-0.08Si) Titanium Alloy datasheet. accessed Jun. 26, 2012.
TIMET TIMETAL® 6-2-4-6 Titanium Alloy (Ti—6Al—2Sn—4Zr—6Mo), Typical, accessed Jun. 26, 2012.
Tokaji, Keiro et al., "The Microstructure Dependence of Fatigue Behavior in Ti—15Mo—5Zr—3Al Alloy," Materials Science and Engineering A., vol. 213 (1996) pp. 86-92.
Two new α-γtitanium alloys, KS Ti-9 for sheet and KS EL-F for forging, with mechanical properties comparable to Ti—6Al—4V, Oct. 8, 2002. ITA 2002 Conference in Orlando, Hideto Oyama, Titanium Technology Dept., Kobe Steel, Ltd., 16 pages.
Veeck, S., et al., "The Castability of Ti-5553 Alloy," Advanced Materials and Processes, Oct. 2004, pp. 47-49.
Weiss, I. et al., "The Processing Window Concept of Beta Titanium Alloys", Recrystallization '90, ed. by T. Chandra, The Minerals, Metals & Materials Society, 1990, pp. 609-616.
Weiss, I. et al., "Thermomechanical Processing of Beta Titanium Alloys—An Overview," Material Science and Engineering, A243, 1998, pp. 46-65.
Williams, J., Thermo-mechanical processing of high-performance Ti alloys: recent progress and future needs, Journal of Material Processing Technology, 117 (2001), p. 370-373.
Yakymyshyn et al., "The Relationship between the Constitution and Mechanical Properties of Titanium-Rich Alloys of Titanium and Cobalt", 1961, vol. 53, pp. 283-294.

(56) References Cited

OTHER PUBLICATIONS

Zardiackas, L.D. et al., "Stress Corrosion Cracking Resistance of Titanium Implant Materials," Transactions of the 27th Annual Meeting of the Society for Biomaterials, (2001).

Zeng et al., Evaluation of Newly Developed Ti-555 High Strength Titanium Fasteners, 17th AeroMat Conference & Exposition, May 18, 2006, 2 pages.

Zhang et al., "Simulation of slip band evolution in duplex Ti—6Al—4V", Acta Materialia, vol. 58, (2010), Nov. 26, 2009, pp. 1087-1096.

Zherebtsov et al., "Production of submicrocrystalline structure in large-scale Ti—6Al—4V billet by warm severe deformation processing", Scripta Materialia, 51, 2004, pp. 1147-1151.

Titanium Alloy, Sheet, Strip, and Plate 4Al—2.5V—1.5Fe, Annealed, AMS6946 Rev. B, Aug. 2010, SAE Aerospace, Aerospace Material Specification, 7 pages.

Titanium Alloy, Sheet, Strip, and Plate 6Al—4V, Annealed, AMS 4911L, Jun. 2007, SAE Aerospace, Aerospace Material Specification, 7 pages.

E112-12 Standard Test Methods for Determining Average Grain Size, ASTM international, Jan. 2013, 27 pages.

ATI Datalloy 2 Alloy, Technical Data Sheet, ATI Properties, Inc., Version 1, Jan. 24, 2013, 6 pages.

ATI AL-6XN® Alloy (UNS N08367), ATI Allegheny Ludlum, 2010, 59 pages.

ATI 800™ /ATI 800™ /ATI 800AT™ ATI Technical Data Sheet, Nickel-base Alloys (UNS N08800/N08810/N08811), 2012 Allegheny Technologies Incorporated, Version 1, Mar. 9, 2012, 7 pages.

ATI 825™ Technical Data Sheet, Nickel-base Alloy (UNS N08825), 2013 Allegheny Technologies Incorporated, Version 2, Mar. 8, 2013, 5 pages.

ATI 625™ Ahoy Technical Data Sheet, High Strength Nickel-base Alloy (UNS N06625), Allegheny Technologies Incorporated, Version 1, Mar. 4, 2012, 3 pages.

ATI 600™ Technical Data Sheet, Nickel-base Ahoy (UNS N06600), 2012 Allegheny Technologies Incorporated, Version 1, Mar. 19, 2012, 5 pages.

Bar definition, ASM Materials Engineering Dictionary, J.R. Davis Ed., ASM International, Materials Park, OH (1992) p. 32.

Billet definition, ASM Materials Engineering Dictionary, J.R. Davis Ed., ASM International, Materials Park, OH (1992) p. 40.

Cogging definition, ASM Materials Engineering Dictionary, J.R. Davis Ed., ASM International, Materials Park, OH (1992) p. 79.

Open die press forging definition; ASM Materials Engineering Dictionary, J.R. Davis Ed., ASM International, Materials Park, OH (1992) pp. 298 and 343.

Thermomechanical working definition, ASM Materials Engineering Dictionary, J.R. Davis Ed., ASM International, Materials Park, OH (1992) p. 480.

Ductility definition, ASM Materials Engineering Dictionary, J.R. Davis Ed., ASM International, Materials Park, OH (1992) p. 131.

AFML-TR-76-80 Development of Titanium Alloy Casting Technology, Aug. 1976, 5 pages.

Valiev et al., "Narrostructured materials produced by sever plastic deformation", Moscow, LOGOS, 2000.

Li et al., "The optimal determination of forging process parameters for Ti—6.5Al—3.5Mo—1.5Zr—0.3Si alloy with thick lamellar microstructure in two phase field based on P-map", Journal of Materials Processing Technology, vol. 210, Issue 2, Jan. 19, 2010, pp. 370-377.

Buijk, A., "Open-Die Forging Simulation", Forge Magazine, Dec. 1, 2013, 5 pages.

Herring, D., "Grain Size and Its Influence on Materials Properties", IndustrialHeating.com, Aug. 2005, pp. 20 and 22.

INCONEL® alloy 600, Special Metals Corporation, www.specialmetals.com, Sep. 2008, 16 pages.

Yaylaci et al., "Cold Working & Hot Working & Annealing", http://yunus.hacettepe.edu.tr/~selis/teaching/WEBkmu479/Ppt/kmu479Presentations2010/Cold_Hot_Working_Annealing.pdf, 2010, 41 pages.

Superaustenitic, http://www.atimetals.com/products/Pages/superaustenitic.aspx, Nov. 9, 2015, 3 pages.

French, D., "Austenitic Stainless Steel", The National Board of Boiler and Pressure Vessel Inspectors Bulletin, 1992, 3 pages.

Acorn Magazine, outokumpu, NACE International, Feb. 2013, 16 pages.

ATI A286™ Iron Based Superalloy (UNS S66286) Technical Data Sheet, Allegheny Technologies Incorporated, Version 1, Apr. 17, 2012, 9 pages.

ATI A286™ (UNS S66286) Technical Data Sheet, Allegheny Technologies Incorporated, Version 1, Mar. 14, 2012, 3 pages.

Corrosion-Resistant Titanium, Technical Data Sheet, Allegheny Technologies Incorporated, Version 1, Feb. 29, 2012, 5 pages.

ATI 3-2.5™ Titanium (Ti Grade 9) Technical Data Sheet. ATI Wah Chang, 2010, 4 pages.

Grade 9 Ti 3Al 2.5V Alloy (UNS R56320), Jul. 30, 2013, http://www.azom.com/articie.aspx?ArticleID=9337, 3 pages.

ATI Ti—6Al—4V, Grade 5, Titanium Alloy (UNS R56400) Technical Data Sheet, Allegheny Technologies incorporated, Version 1, Jan. 31, 2012, 4 pages.

Panin et al., "Low-cost Titanium Alloys for Titanium-Polymer Layered Composites", 29th Congress of the International Council of the Aeronautical Sciences, St. Petersburg, Russia, Sep. 7. 2014, 4 pages.

Grade Ti—4.5Al—3V—2Mo—2Fe Alloy, Jul. 9, 2013, http://www.azom.com/article.aspx?ArticleID=9448, 2 pages.

Garside et al., "Mission Critical Metallics® Recent Developments in High-Strength Titanium Fasteners for Aerospace Applications", ATI, 2013, 21 pages.

Foltz et al., "Recent Developments in High-Strength Titanium Fasteners for Aerospace Applications", ATI, Oct. 22, 2014, 17 pages.

Kosaka et al., "Superplastic Forming Properties of TIMETAL® 54M", Henderson Technical Laboratory, Titanium Metals Corporation, ITA, Oct. 2010, Orlando, Florida, 18 pages.

Markovsky, P. E., "Preparation and properties of ultrafine (submicron) structure titanium alloys", Materials Science and Engineering, 1995, A203, 4 pages.

ATI Datalloy HP™ Alloy, UNS N08830; Technical Data Sheet Version 1, Apr. 14, 2015, 6 pages.

ATI Datalloy 2® Alloy, Technical Data Sheet, Version 1, Feb. 20, 2014, 6 pages.

Handa, Sukhdeep Singh, "Precipitation of Carbides in a Ni-based Superalloy", Degree Project for Master of Science with Specialization in Manufacturing Department of Engineering Science, University West, Jun. 30, 2014, 42 pages.

Titanium Alloy Guide, RMI Titanium Company, Jan. 2000, 45 pages.

Wanhill et al, "Chapter 2, Metallurgy and Microstructure", Fatigue of Beta Processed and Beta Heat-treated Titanium Alloys, SpringerBriefs in Applied Sciences and Technology, 2012, pp. 5-10.

Heat Treating of Titanium and Titanium Alloys, http://www.totalmateria.com/Article97.htm, Apr. 2004, 5 pages.

Grade 6Al 2Sn 4Zr 6Mo Titanium Alloy (UNS R56260); AZoM, http://www.azom.com/article.aspx?ArticleID=9305, Jun. 20, 2013, 4 pages.

Gammon et al., "Metallography and Microstructures of Titanium and Its Alloys", ASM Handbook, vol. 9: Metallography and Microstructures, ASM International, 2004, pp. 899-917.

Rui-gang Deng, et al. "Effects of Forging Process and Following Heat Treatment on Microstructure and Mechanical Properties of TC11 Titanium Alloy," Materials for Mechanical Engineering, vol. 35. No. 11, Nov. 2011, 5 pages. (English abstract included).

Srinivasan et al.. "Rolling of Plates and Sheets from As-Cast Ti—6Al—4V—0.1 B", Journal of Materials Engineering and Performance", vol. 18.4, Jun. 2009, pp. 390-398.

Office Action dated Oct. 19, 2011 in U.S. Appl. No. 12/691,952.
Office Action dated Feb. 2, 2012 in U.S. Appl. No. 12/691,952.
Office Action dated Dec. 23, 2014 in U.S. Appl. No. 12/691,952.
Office Action dated Apr. 23, 2015 in U.S. Appl. No. 12/691,952.
Office Action dated Jul. 28, 2015 in U.S. Appl. No. 12/691,952.
Office Action dated Feb. 17, 2016 in U.S. Appl. No. 12/691,952.
Office Action dated Jun. 28, 2016 in U.S. Appl. No. 12/691,952.

(56) References Cited

OTHER PUBLICATIONS

Applicant-Initiated Interview Summary dated Aug. 22, 2016 in U.S. Appl. No. 12/691,952.
Advisory Action Before the Filing of an Appeal Brief dated Aug. 30, 2016 in U.S. Appl. No. 12/691,952.
Office Action dated Apr. 28, 2017 in U.S. Appl. No. 12/691,952.
Office Action dated Jul. 10 2017 in U.S. Appl. No. 12/691,952.
Advisory Action dated Aug. 7, 2017 in U.S. Appl. No. 12/691,952.
Office Action dated Feb. 20, 2004 in U.S. Appl. No. 10/165,348.
Office Action dated Oct. 26, 2004 in U.S. Appl. No. 10/165,348.
Office Action dated Feb. 16, 2005 in U.S. Appl. No. 10/165,348.
Office Action dated Jul. 25, 2005 in U.S. Appl. No. 10/165,348.
Office Action dated Jan. 3, 2006 in U.S. Appl. No. 10/165,348.
Office Action dated Dec. 16, 2004 in U.S. Appl. No. 10/434,598.
Office Action dated Aug. 17, 2005 in U.S. Appl. No. 10/434,598.
Office Action dated Dec. 19, 2005 in U.S. Appl. No. 10/434,598.
Office Action dated Sep. 6, 2006 in U.S. Appl. No. 10/434,598.
Office Action dated Aug. 6, 2008 in U.S. Appl. No. 11/448,160.
Office Action dated Jan. 13, 2009 in U.S. Appl. No. 11/448,160.
Notice of Allowance dated Apr. 13, 2010 in U.S. Appl. No. 11/448,160.
Notice of Allowance dated Sep. 20, 2010 in U.S. Appl. No. 11/448,160.
Office Action dated Sep. 26, 2007 in U.S. Appl. No. 11/057,614.
Office Action dated Jan. 10, 2008 in U.S. Appl. No. 11/057,614.
Office Action dated Aug. 29, 2008 in U.S. Appl. No. 11/057,614.
Office Action dated Aug. 11, 2009 in U.S. Appl. No. 11/057,614.
Office Action dated Jan. 14, 2010 in U.S. Appl. No. 11/057,614.
Interview summary dated Apr. 14, 2010 in U.S. Appl. No. 11/057,614.
Office Action dated Jun. 21, 2010 in U.S. Appl. No. 11/057,614.
Notice of Allowance dated Sep. 3, 2010 in U.S. Appl. No. 11/057,614.
Office Action dated Apr. 1, 2010 in U.S. Appl. No. 11/745.189.
Interview summary dated Jun. 3, 2010 in U.S. Appl. No. 11/745,189.
Interview summary dated Jun. 15, 2010 in U.S. Appl. No. 11/745,189.
Office Action dated Nov. 24, 2010 in U.S. Appl. No. 11/745,189.
Interview summary dated Jan. 6, 2011 in U.S. Appl. No. 11/745,189.
Notice of Allowance dated Jun. 27, 2011 in U.S. Appl. No. 11/745,189.
Office Action dated Jan. 11, 2011 in U.S. Appl. No. 12/911,947.
Office Action dated Aug. 4, 2011 in U.S. Appl. No. 12/911,947.
Office Action dated Nov. 16, 2011 in U.S. Appl. No. 12/911,947.
Advisory Action dated Jan. 25, 2012 in U.S. Appl. No. 12/911,947.
Notice of Panel Decision from Pre-Appeal Brief Review dated Mar. 28, 2012 in U.S. Appl. No. 12/911,947.
Office Action dated Apr. 5, 2012 in U.S. Appl. No. 12/911,947.
Office Action dated Sep. 19, 2012 in U.S. Appl. No. 12/911,947.
Advisory Action dated Nov. 29, 2012 in U.S. Appl. No. 12/911,947.
Office Action dated May 31, 2013 in U.S. Appl. No. 12/911,947.
Notice of Allowance dated Oct. 4, 2013 in U.S. Appl. No. 12/911,947.
Office Action dated Jan. 3, 2011 in U.S. Appl. No. 12/557,789.
Office Action dated Jul. 27, 2011 in U.S. Appl. No. 12/857,789.
Advisory Action dated Oct. 7, 2011 in U.S. Appl. No. 12/857,789.
Notice of Allowance dated Jul. 1, 2013 in U.S. Appl. No. 12/857,789.
Office Action dated Nov. 14, 2012 in U.S. Appl. No. 12/885,620.
Office Action dated Jun. 13, 2013 in U.S. Appl. No. 12/885,620.
Office Action dated Nov. 19, 2013 in U.S. Appl. No. 12/885,620.
Advisory Action Before the Filing of an Appeal Brief dated Jan. 30, 2014 in U.S. Appl. No. 12/885,620.
Office Action dated Jun. 18. 2014 in U.S. Appl. No. 12/885,620.
Office Action dated Nov. 28, 2014 in U.S. Appl. No. 12/885,620.
Advisory Action dated May 18, 2015 in U.S. Appl. No. 12/885,620.
Office Action dated Jun. 30, 2015 in U.S. Appl. No. 12/885,620.
Notice of Abandonment dated Jan. 29, 2016 in U.S. Appl. No. 12/885,620.
Office Action dated Nov. 14, 2012 in U.S. Appl. No. 12/888,699.
Office Action dated Oct. 3, 2012 in U.S. Appl. No. 12/838,674.
Office Action dated Jul. 18, 2013 in U.S. Appl. No. 12/838,674.
Office Action dated May 27, 2015 in U.S. Appl. No. 12/838,674.
Applicant Initiated Interview Summary dated Sep. 1, 2015 in U.S. Appl. No. 12/838,674.
Notice of Allowance dated Sep. 25, 2015 in U.S. Appl. No. 12/838,674.
Office Action dated Sep. 26, 2012 in U.S. Appl. No. 12/845,122.
Notice of Allowance dated Apr. 17, 2013 in U.S. Appl. No. 12/845,122.
Office Action dated Dec. 24, 2012 in U.S. Appl. No. 13/230,046.
Notice of Allowance dated Jul. 31, 2013 in U.S. Appl. No. 13/230,046.
Office Action dated Dec. 26, 2012 in U.S. Appl. No. 13/230,143.
Notice of Allowance dated Aug. 2, 2013 in U.S. Appl. No. 13/230,143.
Office Action dated Mar. 1, 2013 in U.S. Appl. No. 12/903,851.
Office Action dated Jan. 16, 2014 in U.S. Appl. No. 12/903,851.
Office Action dated Oct. 6, 2014 in U.S. Appl. No. 12/903,851.
Office Action dated Jul. 15, 2015 in U.S. Appl. No. 12/903,851.
Examiner's Answer to Appeal Brief dated Oct. 27, 2016 in U.S. Appl. No. 12/903,851.
Office Action dated Mar. 25, 2013 in U.S. Appl. No. 13/108,045.
Office Action dated Jan. 17, 2014 in U.S. Appl. No. 13/108,045.
Office Action dated Mar. 30, 2016 in U.S. Appl. No. 13/108,045.
Office Action dated Sep. 9, 2016 in U.S. Appl. No. 13/108,045.
Advisory Action dated Mar. 7, 2017 in U.S. Appl. No. 13/108,045.
Office Action dated Apr. 16, 2013 in U.S. Appl. No. 13/150,494.
Office Action dated Jun. 14, 2013 in U.S. Appl. No. 13/150,494.
Notice of Allowance dated Nov. 5, 2013 in U.S. Appl. No. 13/150,494.
Supplemental Notice of Allowability dated Jan. 17, 2014 in U.S. Appl. No. 13/150,494.
U.S. Appl. No. 13/331,135, filed Dec. 20, 2011.
Office Action dated Jan. 21, 2015 in U.S. Appl. No. 13/792,285.
Office Action dated Jun. 4, 2015 in U.S. Appl. No. 13/792,285.
Notice of Allowance dated Sep. 16, 2015 in U.S. Appl. No. 13/792,285.
Response to Rule 312 Communication dated Oct. 20, 2015 in U.S. Appl. No. 13/792,285.
Notice of Allowance dated Oct. 24, 2014 in U.S. Appl. No. 13/844,545.
Notice of Allowance dated Feb. 6, 2015 in U.S. Appl. No. 13/844,545.
Office Action dated Jan. 23, 2013 in U.S. Appl. No. 12/882,538.
Office Action dated Feb. 8, 2013 in U.S. Appl. No. 12/882,538.
Notice of Allowance dated Jun. 24, 2013 in U.S. Appl. No. 12/882,538.
Office Action dated Sep. 6, 2013 in U.S. Appl. No. 13/933,222.
Notice of Allowance dated Oct. 1, 2013 in U.S. Appl. No. 13/933,222.
Notice of Allowance dated May 6, 2014 in U.S. Appl. No. 13/933,222.
Office Action dated Jun. 3, 2015 in U.S. Appl. No. 13/714,465.
Office Action dated Jul. 8. 2015 in U.S. Appl. No. 13/714,465.
Notice of Allowance dated Sep. 2, 2015 in U.S. Appl. No. 13/714,465.
Response to Rule 312 Communication dated Sep. 29, 2015 in U.S. Appl. No. 13/714,465.
Response to Rule 312 Communication dated Oct. 8, 2015 in U.S. Appl. No. 13/714,465.
Office Action dated Jun. 26, 2015 in U.S. Appl. No. 13/777,066.
Office Action dated Oct. 5, 2015 in U.S. Appl. No. 13/777,066.
Advisory Action Before the Filing of an Appeal Brief dated Mar. 17, 2016 in U.S. Appl. No. 13/777,066.
Office Action dated Jul. 22, 2016 in U.S. Appl. No. 13/777,066.
Office Action dated Oct. 12, 2016 in U.S. Appl. No. 13/777,066.
Office Action dated May 18, 2017 in U.S. Appl. No. 13/777,066.
Advisory Action Before the Filing of an Appeal Brief dated Jul. 10, 2017 in U.S. Appl. No. 13/777,066.
Notice of Allowance dated Aug. 30, 2017 in U.S. Appl. No. 13/777,066.
Office Action dated Aug. 19, 2015 in U.S. Appl. No. 13/844,196.
Office Action dated Oct. 15. 2015 in U.S. Appl. No. 13/844,196.
Office Action dated Feb. 12, 2016 in U.S. Appl. No. 13/844,196.
Advisory Action Before the Filing of an Appeal Brief dated Jun. 15, 2016 in U.S. Appl. No. 13/844,196.
Office Action dated Aug. 22, 2016 in U.S. Appl. No. 13/844,196.
Office Action dated Dec. 29, 2016 in U.S. Appl. No. 13/844,196.
Notice of Allowance dated Jul. 3, 2017 in U.S. Appl. No. 13/844,196.
Corrected Notice of Allowability dated Jul. 20, 2017 in U.S. Appl. No. 13/844,196.
Corrected Notice of Allowability dated Aug. 18, 2017 in U.S. Appl. No. 13/844,196.
Office Action dated Oct. 2, 2015 in U.S. Appl. No. 14/073,029.

(56) References Cited

OTHER PUBLICATIONS

Office Action dated Aug. 12, 2016 in U.S. Appl. No. 14/073,029.
Office Action dated Jun. 14, 2017 in U.S. Appl. No. 14/073,029.
Notice of Allowance dated Jul. 7, 2017 in U.S. Appl. No. 14/073,029.
Notice of Allowability dated Sep. 21, 2017 in U.S. Appl. No. 14/073,029.
Office Action dated Oct. 28, 2015 in U.S. Appl. No. 14/093,707.
Office Action dated Mar. 17, 2016 in U.S. Appl. No. 14/093,707.
Advisory Action Before the Filing of an Appeal Brief dated Jun. 10, 2016 in U.S. Appl. No. 14/093,707.
Office Action dated Sep. 30, 2016 in U.S. Appl. No. 14/093,707.
Notice of Allowance dated Jan. 13, 2017 in U.S. Appl. No. 14/093,707.
Supplemental Notice of Allowance dated Jan. 27, 2017 in U.S. Appl. No. 14/093,707.
Supplemental Notice of Allowance dated Feb. 10, 2017 in U.S. Appl. No. 14/093,707.
Supplemental Notice of Allowability dated Mar. 1, 2017 in U.S. Appl. No. 14/093,707.
Notice of Third-Party Submission dated Dec. 16, 2015 in U.S. Appl. No. 14/077,699.
Office Action dated Jul. 25, 2016 in U.S. Appl. No. 14/077,699.
Office Action dated Aug. 16, 2016 in U.S. Appl. No. 14/077,699.
Office Action dated Oct. 25. 2016 in U.S. Appl. No. 14/077,699.
Advisory Action dated Nov. 30, 2016 in U.S. Appl. No. 14/077,699.
Office Action dated Mar. 16, 2016 in U.S. Appl. No. 15/005,281.
Office Action dated Aug. 26, 2016 in U.S. Appl. No. 15/005,281.
Notice of Panel Decision from Pre-Appeal Brief Review dated Feb. 24, 2017 in U.S. Appl. No. 15/005,281.
Office Action dated Mar. 2, 2017 in U.S. Appl. No. 15/005,281.
Notice of Allowance dated May 10, 2017 in U.S. Appl. No. 15/005,281.
Corrected Notice of Allowability dated Aug. 9, 2017 in U.S. Appl. No. 15/005,281.
Office Action dated Apr. 5, 2016 in U.S. Appl. No. 14/028,588.
Office Action dated Aug. 8, 2016 in U.S. Appl. No. 14/028,588.
Advisory Action dated Oct. 14, 2016 in U.S. Appl. No. 14/028,588.
Applicant Initiated Interview Summary dated Oct. 27, 2016 in U.S. Appl. No. 14/028,588.
Office Action dated Mar. 15, 2017 in U.S. Appl. No. 14/028,588.
Office Action dated Jul. 14, 2017 in U.S. Appl. No. 14/028,588.
Advisory Action dated Sep. 12, 2017 in U.S. Appl. No. 14/028,588.
Office Action dated Apr. 13, 2016 in U.S. Appl. No. 14/083,759.
Office Action dated May 6, 2016 in U.S. Appl. No. 14/083.759.
Notice of Allowance dated Oct. 13, 2016 in U.S. Appl. No. 14/083,759.
Notice of Allowance dated Dec. 16, 2018 in U.S. Appl. No. 14/922,750.
Notice of Allowance dated Feb. 28, 2017 in U.S. Appl. No. 14/922,750.
Office Action dated Apr. 10, 2017 in U.S. Appl. No. 14/594,300.
Office Action dated May 25. 2017 in U.S. Appl. No. 14/594,300.
Office Action dated Sep. 13, 2017 in U.S. Appl. No. 14/594,300.
U.S. Appl. No. 15/348,140 filed Nov. 10, 2016.
U.S. Appl. No. 15/653,985, filed Jul. 19, 2017.
U.S. Appl. No. 15/659,661, filed Jul. 28. 2017.
Forging Machinery, Dies, Processes, Metals Handbook Desk Edition, ASM International, 1998, pp. 839-863.
Smith, et al. "Types of Heat-Treating Furnaces," Heat Treating, ASM Handbook, ASM International, 1991, vol. 4, p. 465-474.
Concise Explanation for Third Party Preissuance submission under Rule 1.290 filed in U.S. Appl. No. 15/678,527 dated Jun. 5, 2018.
Guidelines for PWR Steam Generator Tubing Specifications and Repair, Electric Power Research Institute, Apr. 14, 1999, vol. 2, Revision 1, 74 pages. (accessed at https://www.epri.com/#/pages/product/TR-016743-V2R1/).
Materials Reliability Program: Guidelines for Thermally Treated Alloy 690 Pressure Vessel Nozzles, (MRP-241), Electric Power Research Institute, Jul. 25, 2008, 51 pages. (accessed at https://www.epri.com/#/pages/product/1015007/).
Microstructure Etching and Carbon Analysis Techniques, Electric Power Research Institute, May 1, 1990, 355 pages. (accessed at https://www.epri.com/#/pages/product/NP-6720-SD/).
Frodigh, John, "Some Factors Affecting the Appearance of the Microstructure in Alloy 690", Proceedings of the Eighth International Symposium on Environmental Degradation of Materials in Nuclear Power Systems—Water Reactors, American Nuclear Society, Inc., vol. 1, Aug. 10, 1997, 12 pages.
Kajimura et al., "Corrosion Resistance of TT Alloy 690 Manufactured by Various Melting Processes in High Temperature NaOH Solution", Proceedings of the Eighth International Symposium on Environmental Degradation of Materials in Nuclear Power Systems— Water Reactors, American Nuclear Society, Inc., vol. 1, Aug. 10, 1997, pp. 149-156.
Notice of Allowance dated Jun. 6, 2018 in U.S. Appl. No. 12/691,952.
Notice of Allowability dated Jul. 20, 2018 in U.S. Appl. No. 12/691.952.
Office Action dated Apr. 6, 2018 in U.S. Appl. No. 12/903,851.
Office Action dated Oct. 26, 2018 in U.S. Appl. No. 12/903,851.
Office Action dated Nov. 2, 2018 in U.S. Appl. No. 13/108,045.
Office Action dated Jul. 17, 2018 in U.S. Appl. No. 14/077,699.
Notice of Allowance dated Sep. 6, 2018 in U.S. Appl. No. 14/028,588.
Notice of Allowance dated Jun. 29, 2018 in U.S. Appl. No. 14/594,300.
Corrected Notice of Allowability dated Jul. 9, 2018 in U.S. Appl. No. 14/594,300.
Office Action dated Mar. 15, 2018 in U.S. Appl. No. 15/653,985.
Notice of Allowance dated Aug. 15, 2018 in U.S. Appl. No. 15/653,985.
Office Action dated Jul. 30, 2018 in U.S. Appl. No. 14/948,941.
Office Action dated Apr. 2, 2018 in U.S. Appl. No. 14/881,1333.
Office Action dated Aug. 6, 2018 in U.S. Appl. No. 14/881,633.
Notice of Allowance dated Jun. 22, 2018 in U.S. Appl. No. 15/433,443.
Notice of Allowability dated Aug. 27, 2018 in U.S. Appl. No. 15/433,443.
Corrected Notice of Allowability dated Sep. 6, 2018 in U.S. Appl. No. 15/433,443.
Notice of Allowability dated Oct. 11, 2018 in U.S. Appl. No. 15/433,443.
Corrected Notice of Allowability dated Oct. 18, 2018 in U.S. Appl. No. 15/433,443.
U.S. Appl. No. 16/122,174, filed Sep. 5, 2018.
U.S. Appl. No. 16/122,450, filed Sep. 5, 2018.

NICKEL-BASE ALLOY AND ARTICLES

CROSS-REFERENCE TO RELATED APPLICATIONS

This application claims priority under 35 U.S.C. § 120 as a continuation of co-pending U.S. patent application Ser. No. 15/433,443, filed Feb. 15, 2017, which in turn claims priority under 35 U.S.C. § 120 as a continuation of co-pending U.S. patent application Ser. No. 14/093,707, filed Dec. 2, 2013, now issued as U.S. Pat. No. 9,616,480, which in turn claims priority under 35 U.S.C. § 120 as a continuation of co-pending U.S. application Ser. No. 13/150,494, filed Jun. 1, 2011, now issued as U.S. Pat. No. 8,652,400 B2. The contents of the foregoing patent applications are hereby incorporated by reference herein in their entireties.

TECHNICAL FIELD

This disclosure relates to thermo-mechanical processing of nickel-base alloys.

BACKGROUND

Nickel-base alloys are excellent engineering alloys in various applications because the alloys possess a number of advantageous material properties. For example, nickel-base alloys comprising chromium and iron additions have excellent resistance to corrosion in many aqueous media and high-temperature atmospheres. Nickel-base alloys also maintain metallurgical stability and high strength over a broad range of elevated temperatures, and do not form embrittling phases during long-term exposure to elevated temperatures. The combination of good creep and rupture strength, metallurgical stability, and corrosion resistance at high temperatures and over long service periods allows nickel-base alloys to function in applications involving aggressive environments and under severe operating conditions. For example, nickel-base alloys may find utility in engineering applications including: mineral acid production and processing equipment; coal-gasification units; petrochemical processing equipment; incinerators; steam generator tubes, baffles, tube sheets, and other hardware; and structural components in nuclear reactor power generation systems.

SUMMARY

In a non-limiting embodiment, a thermo-mechanical treatment process for nickel-base alloys comprises at least two heating steps and at least two working steps. A nickel-base alloy workpiece is heated in a first heating step to a temperature greater than the $M_{23}C_6$ carbide solvus temperature of the nickel-base alloy. The heated nickel-base alloy workpiece is worked in a first working step to a reduction in area of 20% to 70% to provide a worked nickel-base alloy workpiece. The nickel-base alloy workpiece is at a temperature greater than the $M_{23}C_6$ carbide solvus temperature when the first working step begins. The worked nickel-base alloy workpiece is heated in a second heating step to a temperature greater than 1700° F. (926° C.) and less than the $M_{23}C_6$ carbide solvus temperature of the nickel-base alloy. The worked nickel-base alloy workpiece is maintained at elevated temperature and not permitted to cool to ambient temperature between completion of the first working step and beginning the second heating step. The heated nickel-base alloy workpiece is worked in a second working step to a reduction in area of 20% to 70%. The nickel-base alloy workpiece is at a temperature greater than 1700° F. (926° C.) and less than the $M_{23}C_6$ carbide solvus temperature of the nickel-base alloy when the second working step begins.

In another non-limiting embodiment, a thermo-mechanical treatment process for nickel-base alloys comprises at least two heating steps and at least two forging steps. A nickel-base alloy workpiece is heated in a first heating step to a temperature in the range of 2000° F. to 2125° F. (1093° C. to 1163° C.). The heated nickel-base alloy workpiece is rotary forged in a first forging step to a reduction in area of 30% to 70% to provide a forged nickel-base alloy workpiece. The heated nickel-base alloy workpiece is at a temperature in the range of 2000° F. to 2125° F. (1093° C. to 1163° C.) when the first forging step begins. The forged nickel-base alloy workpiece is heated in a second heating step to a temperature in the range of 1750° F. to 1925° F. (954° C. to 1052° C.). The forged nickel-base alloy workpiece is maintained at elevated temperature and not permitted to cool to ambient temperature between completion of the first forging step and beginning the second heating step. The heated nickel-base alloy workpiece is rotary forged in a second forging step to a reduction in area of 20% to 70%. The heated nickel-base alloy ingot is at a temperature in the range of 1750° F. to 1925° F. (954° C. to 1052° C.) when the second rotary forging step begins.

It is understood that the invention disclosed and described in this specification is not limited to the embodiments summarized in this Summary.

BRIEF DESCRIPTION OF THE DRAWINGS

Various features and characteristics of the non-limiting and non-exhaustive embodiments disclosed and described in this specification may be better understood by reference to the accompanying figures, in which.

Figure 1B:
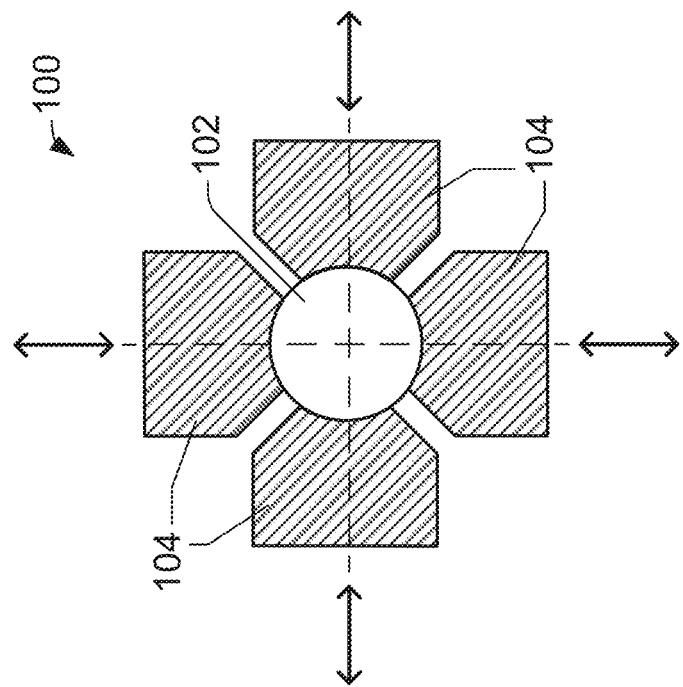
FIGS. 1A and 1B are cross-sectional schematic diagrams of a rotary forging operation.

The reader will appreciate the foregoing details, as well as others, upon considering the following detailed description of various non-limiting and non-exhaustive embodiments according to the present disclosure.

DESCRIPTION

Various embodiments are described and illustrated in this specification to provide an overall understanding of the structure, function, operation, manufacture, and use of the disclosed processes and products. It is understood that the various embodiments described and illustrated in this specification are non-limiting and non-exhaustive. Thus, the invention is not limited by the description of the various non-limiting and non-exhaustive embodiments disclosed in this specification. Rather, the invention is defined solely by the claims. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. § 112, first paragraph, and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "various non-limiting embodiments," or the like, means that a particular feature or characteristic may be included in an embodiment. Thus, use of the phrase "in various non-limiting embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various embodiments may be combined, in whole or in part, with the features or characteristics of one or more other embodiments without limitation. Such modifications and variations are intended to be included within the scope of the present specification.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112, first paragraph, and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

The various embodiments disclosed and described in this specification are directed, in part, to the thermo-mechanical processing of nickel-base alloys. The thermo-mechanical processing disclosed and described in this specification may be used to produce nickel-base alloy products, such as, for example, bars, rods, slabs, rings, strips, plates, and the like. Products produced by the processes described in this specification may be characterized by a defined grain size and a defined precipitated carbide distribution.

Intergranular stress corrosion cracking (IGSCC) is a corrosion mechanism in which cracks form along the grain boundaries of a metallic material under tensile stress and exposed to a corrosive environment. The tensile stresses that promote IGSCC may be in the form of externally applied stresses to a metallic component in service and/or in the form of internal residual stresses in the metallic material. IGSCC is often encountered in applications involving aggressively corrosive environments, such as, for example, structural components in chemical processing equipment and pressurized water reactors (PWR) for nuclear power generation. Nickel-base alloys, such as, for example, Alloy 600 (UNS N06600) and Alloy 690 (UNS N06690), may be used in such applications due to the general corrosion resistance of such alloys. However, nickel-base alloys may nevertheless demonstrate IGSCC under high temperature and high pressure service conditions, for example, in aqueous or steam environments.

Certain thermo-mechanical treatment processes may be used to reduce the susceptibility of nickel-base alloys to IGSCC in aggressively corrosive environments. Combinations of hot working and heat treatments may be used to produce nickel-base alloy products having defined grain sizes and carbide distributions that increase IGSCC resistance. For example, nickel-base alloys including relatively high levels of chromium and iron, such as, for example, Alloy 600 and Alloy 690, may be thermo-mechanically processed by certain known methods to produce products having defined grain sizes with an intergranular distribution of precipitated $M_{23}C_6$ carbides and without chromium depletion in the grains. Intergranular precipitation of $M_{23}C_6$ carbides between the grains in nickel-base alloys significantly reduces sensitization of the alloys in aggressively corrosive environments, which significantly increases resistance to IGSCC.

In various non-limiting embodiments, the processes described herein may be used to thermo-mechanically treat nickel-base alloys such as, for example, Alloy 600 and Alloy 690. For example, in various non-limiting embodiments, Alloy 690 workpieces treated according to embodiments of the thermo-mechanical processes described herein may have a chemical composition comprising (in percentage by total alloy weight/mass): at least 58.0% nickel; 27.0% to 31.0% chromium; 7.0% to 11.0% iron; up to 0.5% manganese; up to 0.05% carbon; up to 0.5% copper; up to 0.5% silicon; up to 0.015% sulfur; and incidental impurities. In various non-limiting embodiments, Alloy 690 workpieces treated according may have a chemical composition comprising any elemental sub-ranges subsumed within the elemental ranges described above. For example, an Alloy 690 workpiece treated according to embodiments of the thermo-mechanical processes described herein may comprise (in percentage by total alloy weight/mass): at least 59.0% nickel; 28.0% to 30.0% chromium; 8.0% to 10.0% iron; up to 0.25% manganese; 0.010% to 0.040% carbon; up to 0.25% copper; up to 0.25% silicon; up to 0.010% sulfur; and incidental impurities. In various non-limiting embodiments, all elemental alloy constituents described in this specification as being "up to" a specified maximum amount also include amounts "greater than zero to" the specified maximum amount.

In various non-limiting embodiments, nickel-base alloy ingots may be produced by vacuum induction melting (VIM) feed materials to produce an alloy comprising a chemical composition conforming to a predetermined compositional specification. For example, feed materials may be used to produce an alloy comprising a chemical composition conforming to the specifications for Alloy 690 described above. The molten alloy produced by VIM, for example, may be cast into an initial ingot. In various non-limiting embodiments, the initial ingot may be used as an input electrode for one or more vacuum arc remelting (VAR) and/or electroslag remelting (ESR) operations to produce a refined ingot. In various non-limiting embodiments, other initial melting and/or remelting operations known in the art, such as, for example, argon oxygen decarburization (AOD) and/or vacuum degassing, alone or in combination with VAR and/or ESR, may be used to produce nickel-base alloy ingots.

In various non-limiting embodiments, a nickel-base alloy ingot may be homogenized using standard heat treatment practices and/or forged to produce a nickel-base alloy workpiece. For example, a nickel-base alloy ingot (in an as-cast, refined, or homogenized condition) may be press forged to produce a workpiece to be used as an input for subsequent thermo-mechanical processing operations. In various other non-limiting embodiments, a nickel-base alloy ingot (in an as-cast, refined, or homogenized condition) may be forge converted to a preform workpiece having any shape and dimensions suitable for subsequent thermo-mechanical processing operations.

In various non-limiting embodiments, thermo-mechanical processing operations may comprise at least two heating steps and at least two working steps. A first heating step may comprise heating a nickel-base alloy workpiece to a carbide supersolvus temperature. A first working step may comprise working (e.g., forging or rolling) the nickel-base alloy workpiece, wherein the nickel-base alloy workpiece is at a carbide supersolvus temperature when the working begins. A second heating step may comprise heating the nickel-base alloy workpiece to a carbide subsolvus temperature. A second working step may comprise working (e.g., forging or rolling) the nickel-base alloy workpiece, wherein the nickel-base alloy workpiece is at a carbide subsolvus temperature when the working begins.

As used herein, including in the claims, the terms "first", "second", "before", "after", and the like, when used in connection with a step or operation, do not exclude the possibility of prior, intervening, and/or subsequent steps or operations. For example, in various non-limiting embodiments, thermo-mechanical processing methods comprising "first" and "second" heating steps and "first" and "second" working steps may further comprise additional heating, working, and/or other steps before, between, and/or after the specified "first" and "second" heating steps and "first" and "second" working steps.

As used herein, the term "carbide supersolvus temperature" refers to temperatures at least as great as the $M_{23}C_6$ carbide solvus temperature of an alloy. As used herein, the term "carbide subsolvus temperature" refers to temperatures less than the $M_{23}C_6$ carbide solvus temperature of an alloy. The $M_{23}C_6$ carbide solvus temperature of an alloy is the lowest temperature at which essentially all of the carbon present in the alloy is in solid solution and the alloy does not comprise any metallographically observable $M_{23}C_6$ carbide phases or precipitates. The $M_{23}C_6$ carbide solvus temperature of an alloy depends upon the chemical composition of the alloy, particularly the carbon content. For example, the $M_{23}C_6$ carbide solvus temperature of Alloy 690 may range from approximately 1915° F. to 2115° F. (1046° C. to 1157° C.) for carbon concentrations ranging from 0.02% to 0.05%, by weight, for a nominal composition of 29.0% chromium, 9.0% iron, 0.2% copper, 0.2% silicon, 0.2% manganese, 0.01% sulfur, 0.25 aluminum, 0.25 titanium, 0.008 nitrogen, and 60.842% to 60.872% nickel, calculated using JMatPro software, available from Sente Software, Surrey, UK. Carbide solvus temperatures may be determined empirically or approximated using phase diagram calculation and materials property simulation software such as, for example, JMatPro software, or Pandat software, available from CompuTherm LLC, Madison, Wis., USA.

As used herein, heating a workpiece "to" a specified temperature or temperature range indicates heating the workpiece for a time sufficient to bring the temperature of the entire workpiece, including the internal material portions of the workpiece, to the specified temperature or into the specified temperature range. Likewise, a condition of a workpiece being heated "to" a specified temperature or temperature range indicates that the workpiece is heated for a time sufficient to bring the temperature of the entire workpiece, including the internal material portions of the workpiece, to the specified temperature or into the specified temperature range. The amount of time needed to heat a workpiece "to" a temperature or temperature range will depend upon the shape and dimensions of the workpiece and the thermal conductivity of the workpiece material, for example.

As used herein, heating a workpiece for a specified period of time or time range "at" a specified temperature or temperature range (i.e., time-at-temperature) indicates heating the workpiece for the specified time or time range measured from the point when the surface temperature of the workpiece (measured, for example, using a thermocouple, pyrometer, or the like) reaches ±25° F. (±14° C.) of the specified temperature or temperature range. As used herein, a specified time-at-temperature does not include the pre-heating time to bring the surface temperature of the workpiece to within ±25° F. (±14° C.) of the specified temperature or temperature range. As used herein, the term "furnace time" indicates the amount of time that a workpiece is maintained inside a controlled temperature environment such as, for example, a furnace, and does not include the time needed to bring the controlled temperature environment to the specified temperature or temperature range.

As used herein, forging, working, or conducting other mechanical processing on a workpiece "at" a specified temperature or temperature range indicates that the temperature of the entire workpiece, including the internal material portions of the workpiece, is at the specified temperature or temperature range when the forging, working, or other mechanical processing begins. It is contemplated that surface cooling and/or adiabatic heating of a workpiece during forging, working, or like operations "at" a specified temperature or temperature range may change the temperature of portions of a workpiece from that specified during the operation.

In various non-limiting embodiments, a thermo-mechanical treatment process comprises a first heating step comprising heating a nickel-base alloy workpiece to a temperature greater than the $M_{23}C_6$ carbide solvus temperature of the nickel-base alloy. The heated nickel-base alloy workpiece may be worked to a reduction in area of 20% to 70% in a first working step to provide a worked nickel-base alloy workpiece. The heated nickel-base alloy workpiece may be at a temperature greater than the $M_{23}C_6$ carbide solvus temperature at the beginning of the first working step. The worked nickel-base alloy workpiece may be heated in a second heating step to a temperature greater than 1700° F. (926° C.) and less than the $M_{23}C_6$ carbide solvus temperature of the nickel-base alloy. The worked nickel-base alloy workpiece may be maintained at elevated temperature and not permitted to cool to ambient temperature between completion of the first working step and the beginning of the second heating step. The nickel-base alloy workpiece may be worked to a second reduction in area of 20% to 70% in a second working step. The nickel-base alloy workpiece may be at a temperature greater than 1700° F. (926° C.) and less than the $M_{23}C_6$ carbide solvus temperature of the nickel-base alloy at the beginning of the second working step. The nickel-base alloy workpiece may be air cooled to ambient temperature after completion of the second working step.

In various non-limiting embodiments, the first heating step, in which a nickel-base alloy workpiece is heated to a carbide supersolvus temperature, may comprise heating the nickel-base alloy workpiece in a furnace operating at 2000° F. to 2125° F. (1093° C. to 1163° C.) for at least 6.0 hours (360 minutes) time-at-temperature. A nickel-base alloy workpiece may be heated to a carbide supersolvus temperature by heating in a furnace operating at 2000° F. to 2125° F. (1093° C. to 1163° C.), or any sub-range subsumed therein such as, for example, 2000° F. to 2100° F. (1093° C. to 1149° C.), 2000° F. to 2075° F. (1093° C. to 1135° C.), 2000° F. to 2050° F. (1093° C. to 1121° C.), 2025° F. to 2075° F. (1107° C. to 1135° C.), 2050° F. to 2125° F. (1121° C. to 1163° C.), 2050° F. to 2100° F. (1121° C. to 1149° C.), or the like.

In various non-limiting embodiments, the second heating step, in which a worked nickel-base alloy workpiece is heated to a carbide subsolvus temperature, may comprise heating the nickel-base alloy workpiece in a furnace operating at a temperature greater than 1700° F. (926° C.) and less than the $M_{23}C_6$ carbide solvus temperature of the nickel-base alloy for greater than 2.0 hours (120 minutes) furnace time. A nickel-base alloy workpiece may be heated to a carbide subsolvus temperature by heating in a furnace operating at 1700° F. to 1950° F. (926° C. to 1066° C.), or any sub-range subsumed therein such as, for example, 1750° F. to 1925° F. (954° C. to 1052° C.), 1750° F. to 1825° F. (954° C. to 996° C.), 1825° F. to 1925° F. (996° C. to 1052° C.), 1775° F. to 1900° F. (968° C. to 1038° C.), 1800° F. to 1875° F. (982° C. to 1024° C.), 1800° F. to 1850° F. (982° C. to 1010° C.), or the like. In various embodiments, the second heating step may comprise heating a nickel-base alloy workpiece in a furnace operating at a carbide subsolvus temperature for greater than 2.0 hours (120 minutes) to 10.0 hours (600 minutes) furnace time, or any sub-range subsumed therein such as, for example, 2.5 to 8.0 hours (150-480 minutes), 3.0 to 10.0 hours (180-600 minutes), 3.0 to 8.0 hours (180-480 minutes), 4.0 to 8.0 hours (240-480 minutes), 5.0 to 8.0 hours (300-480 minutes), or the like.

In various non-limiting embodiments, a nickel-base alloy workpiece may be maintained at elevated temperature and not permitted to cool to room temperature between completion of the first working step and the beginning of the second heating step. For example, a nickel-base alloy workpiece may be maintained at temperatures no less than a temperature that is 300° F. (167° C.) below the $M_{23}C_6$ carbide solvus temperature of the alloy. In various non-limiting embodiments, a nickel-base alloy workpiece may be maintained at temperatures no less than a temperature that is 200° F. (111° C.), 150° F. (83° C.), or 100° F. (56° C.) below the $M_{23}C_6$ carbide solvus temperature of the alloy. In various non-limiting embodiments, a nickel-base alloy workpiece may be maintained at a temperature of at least 1700° F. (926° C.) between completion of the first working step and the beginning of the second heating step. In various non-limiting embodiments, a nickel-base alloy workpiece may be maintained at a temperature of at least 1750° F. (954° C.), 1800° F. (982° C.), 1850° F. (1010° C.), 1900° F. (1038° C.), or 1950° F. (1066° C.) between completion of the first working step and the beginning of the second heating step.

In various non-limiting embodiments, the first working step, the second working step, and any subsequent working steps, may together reduce the cross-sectional area of a workpiece by 40% to 95% relative to the cross-sectional area of the workpiece before the first working step. The first working step, the second working step, and any subsequent working steps, may independently produce reductions in area of 20% to 70%, or any sub-range subsumed therein such as, for example, 30% to 70%, 40% to 60%, 45% to 55%, or the like. The reduction in area produced by the first working step is calculated based on the initial cross-sectional area of the workpiece before the first working step. The reduction in area produced by the second working step is calculated based on the as-worked cross-sectional area produced by the first working step. The reduction in area of any subsequent working step may be calculated based on the as-worked cross-sectional area produced by the preceding working step.

In various non-limiting embodiments, the first working step, the second working step, and any subsequent working steps, may independently comprise one or more passes through the equipment used to perform the particular working step. For example, a first working step may comprise one or more passes through a rotary forge to reduce the cross-sectional area of a workpiece by 20% to 70%, and a second working step may comprise one or more passes through the rotary forge to reduce the cross-sectional area of the workpiece by 20% to 70% relative to the as-worked cross-sectional area of the workpiece produced by the first working step. The total reduction in area produced by the first working step and the second working step may be 40% to 95% relative to the area of the workpiece before the first working step. The reduction in area produced by each individual pass through the rotary forge may be, for example, 5% to 25% relative to the intermediate cross-sectional area produced by the preceding pass.

In various non-limiting embodiments, a heated nickel-base alloy workpiece may be at a temperature greater than the $M_{23}C_6$ carbide solvus temperature at the beginning of the first working step, and a heated nickel-base alloy workpiece may be at a temperature greater than 1700° F. (926° C.) and less than the $M_{23}C_6$ carbide solvus temperature of the nickel-base alloy at the beginning of the second working step. In various non-limiting embodiments, a heated nickel-base alloy workpiece may be at a temperature greater than the $M_{23}C_6$ carbide solvus temperature during the entire first working step. In various non-limiting embodiments, a heated nickel-base alloy workpiece may be at a temperature greater than 1700° F. (926° C.) and less than the $M_{23}C_6$ carbide solvus temperature of the nickel-base alloy during the entire second working step. For example, the dies, anvils, and/or rolls used to perform a working operation may be heated to minimize or eliminate heat loss due to conduction from the surfaces of the workpiece in contact with the working dies, anvils, and/or rolls. Further, adiabatic heating of deforming workpiece material during working steps may compensate, at least in part, for loss of heat from the workpiece.

In various non-limiting embodiments, the first working step and the second working step may independently comprise one or more forging or rolling operations such as, for example, flat rolling, ring rolling, roll forming, press forging, extrusion, rotary forging, and the like. In various embodiments, the first working step and the second working step may each comprise one or more rotary forging passes.

Figure 1A:
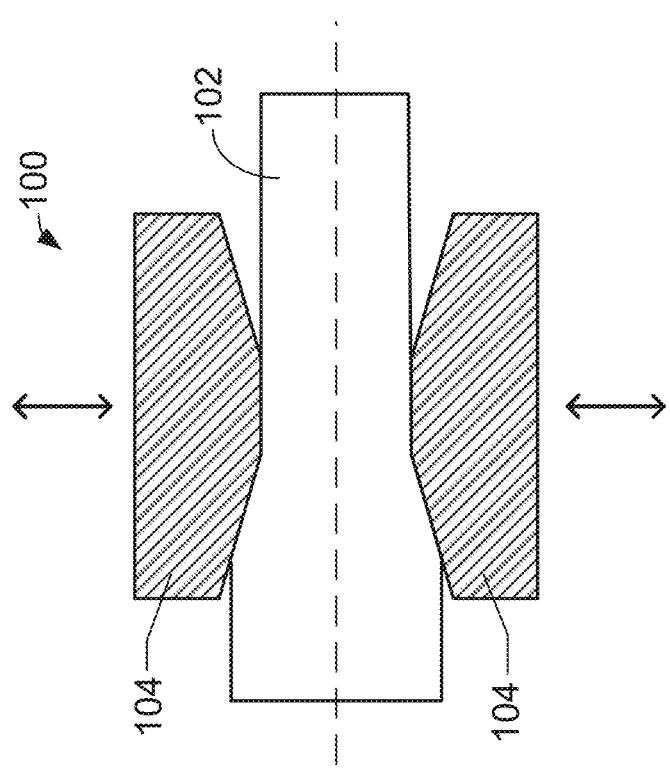

As used herein, the term "rotary forging" refers to the working of elongated workpieces such as, for example, tubes, bars, and rods, using two or more anvils/dies to compressively deform the workpiece perpendicular to the long axis of the workpiece, thereby decreasing the cross-sectional area of the workpiece and increasing the length of the workpiece to produce long products. A rotary forging operation 100 is illustrated in FIGS. 1A and 1B in which a cylindrical bar/rod-type workpiece 102 is compressively deformed by anvils/dies 104, thereby decreasing the cross-sectional area of the workpiece and increasing the length of the workpiece. Rotary forging produces solid or tubular long products with constant or varying cross-sections along their length. Rotary forging, also known as rotary swaging or radial forging, is not to be confused with orbital (i.e., rocking die) forging in which a workpiece is pressed between a non-rotating flat anvil/die and a swiveling (rocking) die with a conical working face that makes orbital, spiral, planetary, or straight-line motions.

In various non-limiting embodiments, a thermo-mechanical treatment process may comprise a first heating step comprising heating an Alloy 690 workpiece to a temperature greater than the $M_{23}C_6$ carbide solvus temperature of the alloy. For example, the first heating step may comprise heating an Alloy 690 workpiece to a temperature in the range of 2000° F. to 2125° F. (1093° C. to 1163° C.). In various non-limiting embodiments, the Alloy 690 workpiece may have a chemical composition comprising, by weight, up to 0.05% carbon; 27.0% to 31.0% chromium; up to 0.5% copper; 7.0% to 11.0% iron; up to 0.5% manganese; up to 0.015% sulfur; up to 0.5% silicon; at least 58% nickel; and incidental impurities.

The heated Alloy 690 workpiece may be rotary forged to a reduction in area of 20% to 70% in a first forging step comprising one or more rotary forging passes. The heated Alloy 690 workpiece may be at a temperature greater than the $M_{23}C_6$ carbide solvus temperature at the beginning of the first forging step, such as, for example, at a temperature in the range of 2000° F. to 2125° F. (1093° C. to 1163° C.) when the first forging step begins. The forged Alloy 690 workpiece may be heated in a second heating step to a temperature greater than 1700° F. (926° C.) and less than the $M_{23}C_6$ carbide solvus temperature of the nickel-base alloy. For example, the second heating step may comprise heating a forged Alloy 690 workpiece to a temperature in the range of 1750° F. to 1925° F. (954° C. to 1052° C.). The forged Alloy 690 workpiece may be maintained at a temperature of at least 1700° F. (926° C.) between completion of the first forging step and the beginning of the second heating step.

The heated Alloy 690 workpiece may be rotary forged to a second reduction in area of 20% to 70% in a second forging step comprising one or more rotary forging passes. The heated Alloy 690 workpiece may be at a temperature greater than 1700° F. (926° C.) and less than the $M_{23}C_6$ carbide solvus temperature at the beginning of the second forging step, such as, for example, at a temperature in the range of 1750° F. to 1925° F. when the second forging step begins. The Alloy 690 workpiece may be air cooled to ambient temperature after completion of the second forging step.

In various non-limiting embodiments, nickel-base alloy workpieces, such as, for example, Alloy 690 workpieces, may be further heat treated after the at least two heating steps and the at least two working steps. For example, nickel-base alloy workpieces may be annealed at a temperature of at least 1800° F. (982° C.), but no greater than the $M_{23}C_6$ carbide solvus temperature of the nickel-base alloy, for at least 3.0 hours time-at-temperature. In various non-limiting embodiments, nickel-base alloy workpieces may be annealed at a temperature of 1800° F. to 2000° F. (982° C. to 1093° C.), or any sub-range subsumed therein, such as, for example, 1840° F. to 1960° F. (1004° C. to 1071° C.), 1850° F. to 1950° F. (1010° C. to 1066° C.), 1875° F. to 1925° F. (1024° C. to 1052° C.), or the like. In various non-limiting embodiments, nickel-base alloy workpieces may be annealed for at least 4.0 hours time-at-temperature. In various non-limiting embodiments, nickel-base alloy workpieces may be water quenched after annealing heat treatment.

In various non-limiting embodiments, nickel-base alloy workpieces, such as, for example, Alloy 690 workpieces, may be aged after the at least two heating steps and the at least two working steps. For example, nickel-base alloy workpieces may be aged at a temperature of 1300° F. to 1400° F. (704° C. to 760° C.) for at least 3.0 hours time-at-temperature. In various non-limiting embodiments, nickel-base alloy workpieces may be aged at a temperature of 1300° F. to 1400° F. (704° C. to 760° C.), or any sub-range subsumed therein, such as, for example, 1325° F. to 1375° F. (718° C. to 746° C.), 1310° F. to 1360° F. (710° C. to 738° C.), or the like. In various non-limiting embodiments, nickel-base alloy workpieces may be aged for at least 4.0 hours time-at-temperature. In various non-limiting embodiments, nickel-base alloy workpieces may be air cooled after aging heat treatment.

In various non-limiting embodiments, nickel-base alloy workpieces may be annealed and aged. For example, after the at least two heating steps and the at least two working steps, nickel-base alloy workpieces may be air cooled to ambient temperature and then annealed at a temperature of at least 1800° F. (982° C.), but no greater than the $M_{23}C_6$ carbide solvus temperature of the nickel-base alloy, for at least 3.0 hours time-at-temperature. The nickel-base alloy workpieces may be water quenched after annealing heat treatment and then aged at a temperature of 1300° F. to 1400° F. (704° C. to 760° C.) for at least 3.0 hours time-at-temperature.

The processes described herein may be used, for example, to produce forged and/or rolled products. For example, in various non-limiting embodiments, the at least two heating steps and the at least two working steps convert preform workpieces into products including long products, such as, for example, round bar and rod, rectangular bar and rod, hexagonal bar and rod, forged rectangular long products, and rolled rectangular long products. The processes disclosed herein may be used, for example, to produce long products with constant or varying cross-sections along their length. In embodiments producing long products having varying cross-sections along their length, the first working step and the second working step may together reduce the cross-sectional area of a workpiece by 40% to 95% at one or more locations along the length of the long product. In addition, the processes disclosed herein may be used, for example, to produce rotary forged tubes.

In various non-limiting embodiments, products produced by the processes described herein may satisfy the requirements of ASTM B166-08: *Standard Specification for Nickel-Chromium-Iron Alloys (UNS N06600, N06601, N06603, N06690, N06693, N06025, N06045, and N06696) and Nickel-Chromium-Cobalt-Molybdenum Alloy (UNS N06617) Rod, Bar, and Wire* (2008), and ASME SB-166: *Specification for Nickel-Chromium-Iron Alloys (UNS N06600, N06601, N06603, N06690, N06693, N06025, N06045, and N06696) and Nickel-Chromium-Cobalt-Molybdenum Alloy (UNS N06617) Rod, Bar, and Wire* (2007), which are incorporated by reference into this specification.

In various non-limiting embodiments, products produced by the processes described herein may have a grain size of ASTM No. 3.0 to 9.0, determined in accordance with ASTM E 112-10: *Standard Test Methods for Determining Average Grain Size* (2010), which is incorporated by reference into this specification. In various non-limiting embodiments, products produced by the processes described herein may have a grain size in the range of ASTM No. 3.0 to 9.0, or any sub-range subsumed therein such as, for example, ASTM No. 3.0 to 8.0, 3.5 to 7.5, 4.0 to 7.0, 4.5 to 6.5, 3.0 to 7.0, 3.0 to 6.0, or the like. In various non-limiting embodiments, products produced by the processes described herein may comprise intergranular $M_{23}C_6$ carbide precipitates uniformly distributed on the grain boundaries. In various non-limiting embodiments, products produced by the processes described herein may comprise minimal metallographically observable intragranular $M_{23}C_6$ carbide precipitates. In various non-limiting embodiments, products produced by the processes described herein may lack metallographically observable intragranular $M_{23}C_6$ carbide precipitates.

The microstructural carbide distribution may be determined metallographically, for example, by using scanning electron microscopy (SEM) to evaluate chemically etched (e.g., bromine-methanol etch solution) specimens of nickel-base alloy processed according to various non-limiting embodiments described herein. For example, in various non-limiting embodiments, products produced by the processes described herein, when evaluated using SEM at 500× magnification, may comprise intergranular $M_{23}C_6$ carbide precipitates uniformly distributed on all observable grain boundaries and comprise minimal, or lack, observable intragranular $M_{23}C_6$ carbide precipitates. In various non-limiting embodiments, products produced by the processes described herein comprise equiaxed grains with a grain size of ASTM No. 3.0 to 9.0, a uniform grain size distribution, intergranular $M_{23}C_6$ carbide precipitates uniformly distributed on metallographically observable grain boundaries, and minimal metallographically observable intragranular $M_{23}C_6$ carbide precipitates.

Figure 2A:
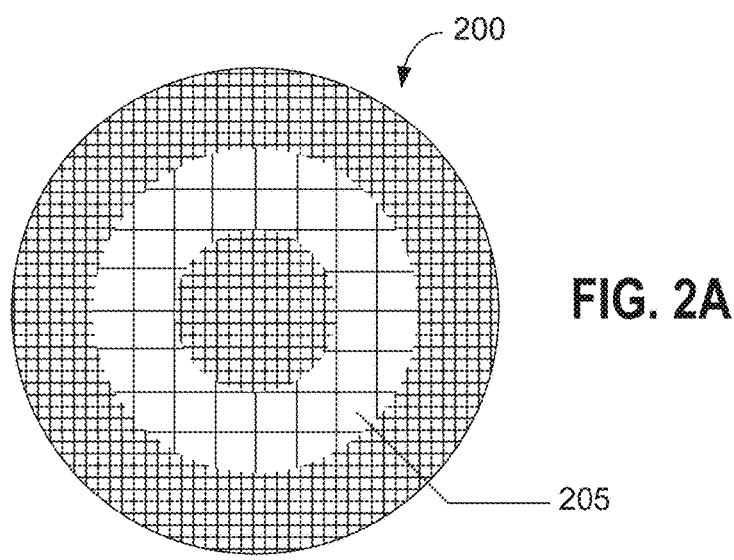
FIG. 2A is a cross-sectional schematic diagram and FIG. 2B is a perspective schematic diagram of a hot-forged and heat-treated long product having a ring-shaped region of abnormal grain growth.
Figure 2B:
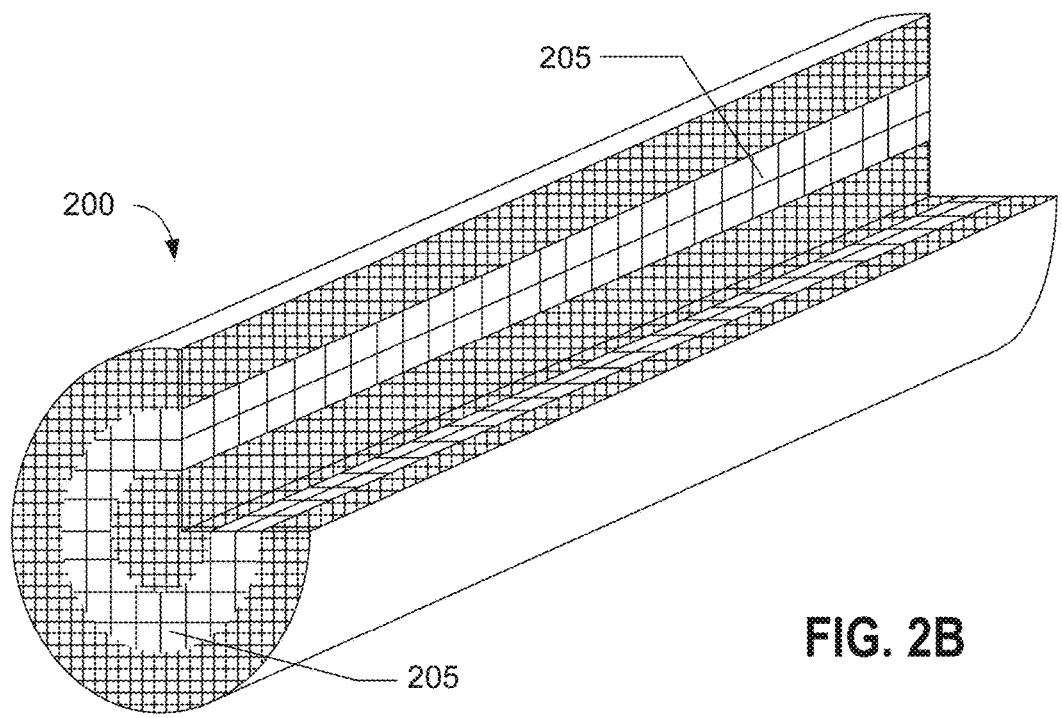

The processes described herein reduce or eliminate abnormal grain growth that creates a non-uniform grain size distribution on a macroscopic scale. To control the grain size within specified limits, nickel-base alloy workpieces, such as, for example, Alloy 690 workpieces, may be hot worked at temperatures above both the recrystallization temperature and the carbide solvus temperature of the alloy, i.e., working at supersolvus temperatures. However, subsequent heat treatments to produce a uniform distribution of intergranular $M_{23}C_6$ carbide precipitates often cause an abnormal and non-uniform grain growth in sections of the macrostructure of the workpieces. For example, hot-worked rods and round bars of nickel-base alloy such as, for example, Alloy 690, tend to develop a ring-shaped region of abnormal grain growth through the cross-section of the product. FIGS. 2A and 2B schematically illustrate a long product 200 such as, for example, a rod or round bar of nickel-base alloy such as Alloy 690. The long product 200 includes a ring-shaped region 205 of abnormal grain growth through the cross-section of the product.

While not wishing to be bound by theory, it is believed that hot working at supersolvus temperatures to control grain size produces an intrinsic internal strain in the workpieces that causes the abnormal grain growth. The intrinsic internal strain is believed to be caused by differential thermal expansion of the workpiece during hot working and cooling after the hot working. The surface material of the workpieces cools much more rapidly than the internal material, particularly the material toward the center of the workpiece, when in contact with working dies/anvils and during subsequent cooling. This establishes a sharp temperature differential between the cooler surface and near-surface material and the hotter internal material. The temperature differential results in differential thermal expansion from the high temperature in the center to the low temperature at the surface of the hot-worked product, which is believed to produce an intrinsic internal strain in the material. During subsequent heat treatments to produce a uniform distribution of intergranular $M_{23}C_6$ carbide precipitates, the internal strain is believed to drive the abnormal grain growth, which localizes in the regions of the internal strain caused by the differential thermal expansion during cooling. This is believed to result in the observed ring-shaped regions of abnormal and non-uniform grain growth in the macrostructure of the products.

These deleterious regions of abnormal grain growth may be mitigated by working nickel-base alloy workpieces such as, for example, Alloy 690 workpieces, at temperatures below the carbide solvus temperature of the alloy, i.e., at subsolvus temperatures. However, after working at subsolvus temperatures, subsequent heat treatments to produce a uniform distribution of intergranular $M_{23}C_6$ carbide precipitates often causes unacceptable grain growth throughout the entire workpiece. The grain size is difficult to control and the heat treatments often produce grain sizes greater than ASTM No. 3.0 (i.e., ASTM Nos. less than 3.0.). Further, all of the carbides are not dissolved during working at subsolvus temperatures. As a result, the intergranular carbide distribution produced during subsequent heat treatments often includes large stringers of grain boundary carbides that were present between the large grains in the preform workpieces and that did not dissolve before, during, or after working at subsolvus temperatures.

The processes described herein reduce or eliminate the abnormal grain growth that creates a non-uniform grain size distribution on a macroscopic scale, and produce products having equiaxed grains with a grain size of ASTM No. 3.0 to 9.0, a uniform grain size distribution, intergranular $M_{23}C_6$ carbide precipitates uniformly distributed on the grain boundaries, and minimal intragranular $M_{23}C_6$ carbide precipitates. In the first of the at least two heating steps, a nickel-base alloy workpiece is heated to a carbide supersolvus temperature, which dissolves all of the $M_{23}C_6$ carbides present in the preform workpiece. In the first of the at least two working steps, the nickel-base alloy workpiece is worked at a carbide supersolvus temperature, for example, to a reduction in area of 20% to 70%. The working at the carbide supersolvus temperature prevents carbide precipitation and produces a uniform grain size distribution with grain sizes in the range of ASTM No. 3.0 to 9.0.

In the second of the at least two heating steps, the nickel-base alloy workpiece is heated to a carbide subsolvus temperature. The workpiece stabilizes at the subsolvus temperatures and is not permitted to cool to ambient temperature between the first working step and the second heating step. This minimizes any carbide precipitation because the workpiece material does not cool through the critical "nose" region of the time-temperature-transformation (TTT) curve of the material, at which the kinetics of carbide precipitation are the fastest. Nucleation and precipitation of carbides is very slow at carbide subsolvus temperatures within approximately 300° F. (167° C.) of the carbide solvus temperature, for example. This prevents uncontrolled carbide precipitation. In the second of the at least two working steps, the nickel-base alloy workpiece is worked at a carbide subsolvus temperature, for example, to a reduction in area of 20% to 70%. The working at the carbide subsolvus temperature reduces the differential thermal expansion and intrinsic internal strain in the material that is believed to cause abnormal grain growth during subsequent heat treatments.

The non-limiting and non-exhaustive examples that follow are intended to further describe various non-limiting and non-exhaustive embodiments without restricting the scope of the embodiments described in this specification.

EXAMPLES

Heats of Alloy 690 were prepared by melting feed materials using VIM. The chemical compositions of the Alloy 690 heats were in compliance with ASTM B166-08: *Standard Specification for Nickel-Chromium-Iron Alloys (UNS N06600, N06601, N06603, N06690, N06693, N06025, N06045, and N06696) and Nickel-Chromium-Cobalt-Molybdenum Alloy (UNS N06617) Rod, Bar, and Wire* (2008) and ASME SB-166: *Specification for Nickel-Chromium-Iron Alloys (UNS N06600, N06601, N06603, N06690, N06693, N06025, N06045, and N06696) and Nickel-Chromium-Cobalt-Molybdenum Alloy (UNS N06617) Rod, Bar, and Wire* (2007), which are incorporated by reference herein.

The VIM heats were cast into initial ingots that were used as input electrodes for ESR. The ESR operation produced refined cylindrical ingots having diameters of approximately 20 inches (508 millimeters). The 20-inch ESR ingots were homogenized using standard practices and press forged to produce cylindrical workpieces having diameters of approximately 14 inches (356 millimeters).

The workpieces were thermo-mechanically treated according to non-limiting embodiments of the processes described herein comprising two heating steps and two working steps. In a first heating step, the workpieces were heated in a furnace operating at 2000° F. to 2050° F. (1093° C. to 1121° C.) for at least 6 hours time-at-temperature. In a first working step, the heated workpieces were rotary forged to approximately 9.6 inch (243 millimeter) diameters, which corresponds to a reduction in area of approximately 53%. The first working step comprised four passes through the rotary forge, each pass producing an approximately 17% to 18% reduction in area. The entire workpiece was at a temperature in the range of approximately 2000° F. to 2050° F. when the first working step began. During the rotary forging passes, the to-die and off-die surface temperatures of the workpieces were maintained in the range of 1700° F. to 2050° F. (926° C. to 1121° C.) for all four (4) passes.

After completion of the rotary forging, the surface temperatures of the workpieces were not permitted to cool to ambient temperature and the workpieces were immediately charged into a furnace operating at 1825° F. (996° C.). In a second heating step, the forged workpieces were heated in the furnace for approximately 1.0 hour, 2.0 hours, 4.0 hours, or 8.0 hours furnace time. In a second working step, the heated workpieces were rotary forged a second time to approximately 7.2 inch (182 millimeter) diameters, which corresponds to a reduction in area of approximately 44% relative to the intermediate 9.6 inch (243 millimeter) diameters. The second working step comprised three passes through the rotary forge, each pass producing a 17% to 18% reduction in area. The entire workpiece was at a temperature of approximately 1825° F. (996° C.) when the second working step began. During the second working step, the to-die and off-die surface temperatures of the workpiece were maintained in the range of 1700° F. to 2050° F. (926° C. to 1121° C.) for all three passes. The workpieces were air cooled to ambient temperature after completion of the second working step. The total reduction in area produced by the two working steps was approximately 74%.

The twice-heated and twice-rotary-forged workpieces were annealed at 1875° F. (1024° C.) for four (4) hours time-at-temperature followed by a water quench to ambient temperature. The quenched workpieces were aged at 1340° F. for four (4) hours time-at-temperature and air cooled to ambient temperature.

Figure 3A:
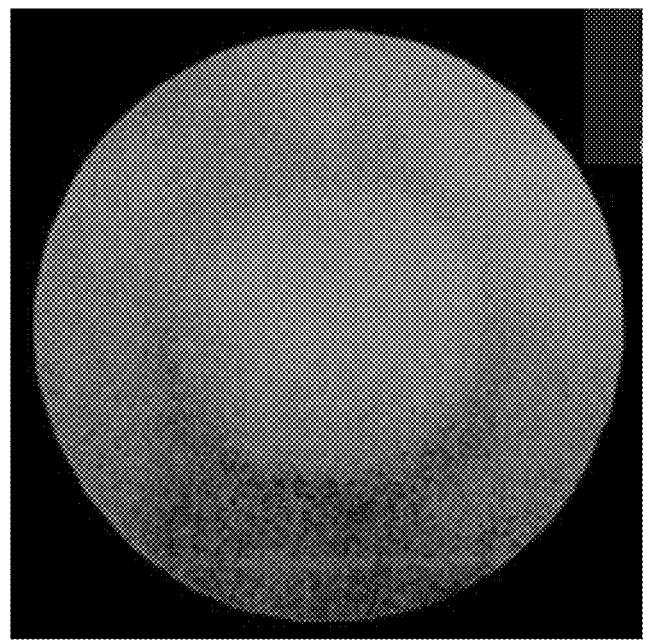
FIGS. 3A through 3D are metallographs of the cross-sectional macrostructure of regions of Alloy 690 long products showing various effects of thermo-mechanical processing according to various non-limiting embodiments described herein.
Figure 3B:
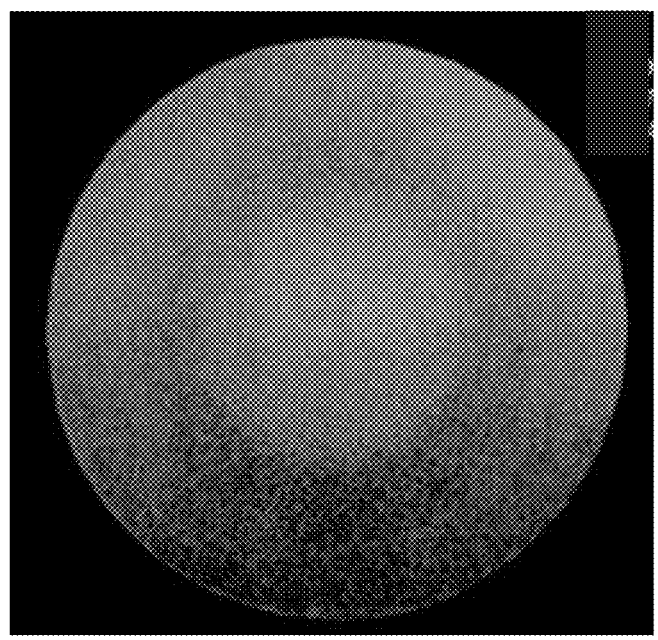
Figure 3C:
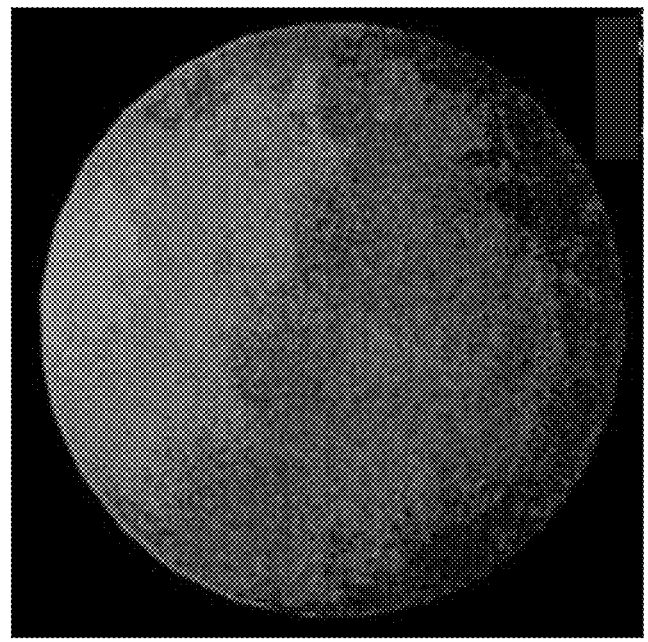
Figure 3D:
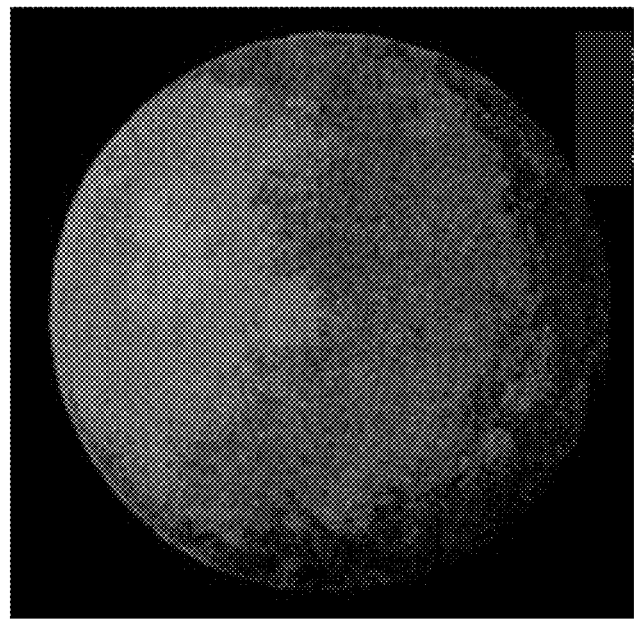

Cross-sections of the workpieces were etched using standard practices and the macrostructure evaluated metallographically. FIG. 3A is a metallograph of a cross-section of a workpiece heated for approximately 1 hour furnace time in a furnace operating at 1825° F. (996° C.) between the first working step and the second working step. FIG. 3B is a metallograph of a cross-section of a workpiece heated for approximately 2 hours furnace time in a furnace operating at 1825° F. (996° C.) between the first working step and the second working step. FIG. 3C is a metallograph of a cross-section of a workpiece heated for approximately 4 hours furnace time in a furnace operating at 1825° F. (996° C.) between the first working step and the second working step. FIG. 3D is a metallograph of a cross-section of a workpiece heated for approximately 8 hours furnace time in a furnace operating at 1825° F. (996° C.) between the first working step and the second working step.

As shown in FIGS. 3A and 3B, the workpieces heated for approximately 1 hour and 2 hours furnace time in a furnace operating at 1825° F. (996° C.) developed a ring-shaped region of abnormal grain growth. As shown in FIGS. 3C and 3D, the workpieces heated for approximately 4 hours and 8 hours furnace time in a furnace operating at 1825° F. (996° C.) did not exhibit any abnormal grain growth. The grain size of the workpieces heated for approximately 4 hours and 8 hours furnace time was in the range of ASTM No. 3.0 to 8.0, determined in accordance with ASTM E 112-10. The workpieces formed intergranular $M_{23}C_6$ carbide precipitates uniformly distributed on the grain boundaries and exhibited minimal intragranular $M_{23}C_6$ carbide precipitation.

The processes described in this specification produce nickel-base alloy products having a microstructure and macrostructure that provides superior properties for critical engineering applications such as, for example, structural components in chemical processing equipment and PWRs for nuclear power generation. This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant reserves the right to amend the claims during prosecution to add features as variously described in this specification, and such amendments comply with the requirements of 35 U.S.C. § 112, first paragraph, and 35 U.S.C. § 132(a).

What is claimed is:

1. An alloy comprising:
   up to 0.05 weight percent carbon;
   27.0 to 31.0 weight percent chromium;
   up to 0.5 weight percent copper;
   7.0 to 11.0 weight percent iron;
   up to 0.5 weight percent manganese;
   up to 0.015 weight percent sulfur;
   up to 0.5 weight percent silicon;
   at least 58 weight percent nickel; and
   incidental impurities;
   wherein the alloy exhibits an ASTM grain size of 3.0 to 9.0, exhibits a uniform grain size distribution, includes intergranular $M_{23}C_6$ carbide precipitates uniformly distributed on grain boundaries, and includes minimal or no intragranular $M_{23}C_6$ carbide precipitates.

2. The alloy of claim 1, wherein the alloy exhibits an ASTM grain size of 3.0 to 8.0.

3. The alloy of claim 1, wherein the alloy exhibits an ASTM grain size of 3.5 to 7.5.

4. The alloy of claim 1, wherein the alloy exhibits an ASTM grain size of 4.5 to 6.5.

5. The alloy of claim 1, wherein the alloy exhibits an ASTM grain size of 3.0 to 6.0.

6. The alloy of claim 1, wherein the alloy lacks intragranular $M_{23}C_6$ carbide precipitates.

7. The alloy of claim 1, wherein chemically etched specimens of the alloy lack metallographically observable intragranular $M_{23}C_6$ carbide precipitates when observed at 500× magnification by scanning electron microscopy.

8. The alloy of claim 1, wherein chemically etched specimens of the alloy include uniformly distributed intergranular $M_{23}C_6$ carbide precipitates on grain boundaries when observed at 500× magnification by scanning electron microscopy.

9. The alloy of claim 1, wherein the alloy lacks stringers of grain boundary precipitates.

10. The alloy of claim 1 comprising:
    up to 0.05 weight percent carbon;
    28.0 to 30.0 weight percent chromium;
    up to 0.25 weight percent copper;
    8.0 to 10.0 weight percent iron;
    up to 0.25 weight percent manganese;
    up to 0.010 weight percent sulfur;
    up to 0.25 weight percent silicon;
    at least 58 weight percent nickel; and
    incidental impurities.

11. The alloy of claim 10, wherein the alloy lacks intragranular $M_{23}C_6$ carbide precipitates.

12. The alloy of claim 10, wherein chemically etched specimens of the alloy lack metallographically observable intragranular $M_{23}C_6$ carbide precipitates when observed at 500× magnification by scanning electron microscopy.

13. The alloy of claim 10, wherein chemically etched specimens of the alloy include uniformly distributed intergranular $M_{23}C_6$ carbide precipitates on grain boundaries when observed at 500× magnification by scanning electron microscopy.

14. The alloy of claim 10, wherein the alloy lacks stringers of grain boundary precipitates.

15. An alloy comprising:
    up to 0.05 weight percent carbon;
    27.0 to 31.0 weight percent chromium;
    up to 0.5 weight percent copper;
    7.0 to 11.0 weight percent iron;
    up to 0.5 weight percent manganese;
    up to 0.015 weight percent sulfur;
    up to 0.5 weight percent silicon;
    at least 58 weight percent nickel; and
    incidental impurities;
    wherein the alloy exhibits an ASTM grain size of 3.0 to 9.0 and a uniform grain size distribution;
    wherein chemically etched specimens of the alloy include uniformly distributed intergranular $M_{23}C_6$ carbide precipitates on grain boundaries when observed at 500× magnification by scanning electron microscopy; and
    wherein chemically etched specimens of the alloy lack metallographically observable intragranular $M_{23}C_6$ carbide precipitates when observed at 500× magnification by scanning electron microscopy.

16. The alloy of claim 15 comprising:
    up to 0.05 weight percent carbon;
    28.0 to 30.0 weight percent chromium;
    up to 0.25 weight percent copper;
    8.0 to 10.0 weight percent iron;
    up to 0.25 weight percent manganese;
    up to 0.010 weight percent sulfur;
    up to 0.25 weight percent silicon;
    at least 58 weight percent nickel; and
    incidental impurities.

17. An article of manufacture including an alloy comprising:
    up to 0.05 weight percent carbon;
    27.0 to 31.0 weight percent chromium;
    up to 0.5 weight percent copper;
    7.0 to 11.0 weight percent iron;
    up to 0.5 weight percent manganese;
    up to 0.015 weight percent sulfur;
    up to 0.5 weight percent silicon;
    at least 58 weight percent nickel; and
    incidental impurities;
    wherein the alloy exhibits an ASTM grain size of 3.0 to 9.0, exhibits a uniform grain size distribution, includes intergranular $M_{23}C_6$ carbide precipitates uniformly distributed on grain boundaries, and includes minimal or no intragranular $M_{23}C_6$ carbide precipitates.

18. The article of manufacture of claim 17, wherein the article is one of a forged article and a rolled article.

19. The article of manufacture of claim 18, wherein the article is selected from a rod, a bar, a round bar, a round rod, a rectangular bar, a rectangular rod, a hexagonal bar, a hexagonal rod, a forged rectangular long product, a rolled rectangular long product, a tube, a forged tube, and a rotary forged tube.

20. The article of manufacture of claim 18, wherein the alloy comprises:
    up to 0.05 weight percent carbon;
    28.0 to 30.0 weight percent chromium;
    up to 0.25 weight percent copper;
    8.0 to 10.0 weight percent iron;
    up to 0.25 weight percent manganese;
    up to 0.010 weight percent sulfur;
    up to 0.25 weight percent silicon;
    at least 58 weight percent nickel; and
    incidental impurities.

21. The article of manufacture of claim 18, wherein the alloy exhibits an ASTM grain size of 3.0 to 8.0.

22. The article of manufacture of claim 18, wherein the alloy exhibits an ASTM grain size of 3.5 to 7.5.

23. The article of manufacture of claim 18, wherein the alloy exhibits an ASTM grain size of 4.5 to 6.5.

24. The article of manufacture of claim 18, wherein the alloy exhibits an ASTM grain size of 3.0 to 6.0.

25. The article of manufacture of claim 18, wherein the alloy lacks intragranular $M_{23}C_6$ carbide precipitates.

26. The article of manufacture of claim 18, wherein chemically etched specimens of the alloy lack metallographically observable intragranular $M_{23}C_6$ carbide precipitates when observed at 500× magnification by scanning electron microscopy.

27. The article of manufacture of claim 18, wherein chemically etched specimens of the alloy include uniformly distributed intergranular $M_{23}C_6$ carbide precipitates on grain boundaries when observed at 500× magnification by scanning electron microscopy.

28. The article of manufacture of claim 18, wherein the alloy lacks stringers of grain boundary precipitates.

29. An article of manufacture including an alloy comprising:
    up to 0.05 weight percent carbon;
    27.0 to 31.0 weight percent chromium;
    up to 0.5 weight percent copper;
    7.0 to 11.0 weight percent iron;
    up to 0.5 weight percent manganese;
    up to 0.015 weight percent sulfur;
    up to 0.5 weight percent silicon;
    at least 58 weight percent nickel; and
    incidental impurities;
    wherein the alloy exhibits an ASTM grain size of 3.0 to 9.0 and a uniform grain size distribution;
    wherein chemically etched specimens of the alloy include uniformly distributed intergranular $M_{23}C_6$ carbide precipitates on grain boundaries when observed at 500× magnification by scanning electron microscopy;
    wherein chemically etched specimens of the alloy lack metallographically observable intragranular $M_{23}C_6$ carbide precipitates when observed at 500× magnification by scanning electron microscopy; and
    wherein the article is selected from a forged article and a rolled article.

30. The article of manufacture of claim 29, wherein the article is selected from a rod, a bar, a round bar, a round rod, a rectangular bar, a rectangular rod, a hexagonal bar, a hexagonal rod, a forged rectangular long product, a rolled rectangular long product, a tube, a forged tube, and a rotary forged tube.

* * * * *